United States Patent
Collin et al.

(10) Patent No.: US 11,932,260 B2
(45) Date of Patent: Mar. 19, 2024

(54) SELECTING TESTING SCENARIOS FOR EVALUATING THE PERFORMANCE OF AUTONOMOUS VEHICLES

(71) Applicant: Motional AD LLC, Boston, MA (US)

(72) Inventors: Anne Collin, Cambridge, MA (US); Radboud Duintjer Tebbens, Winchester, MA (US); Dmytro S. Yershov, Cambridge, MA (US); Calin Belta, Sherborn, MA (US); Amitai Bin-Nun, Silver Spring, MD (US)

(73) Assignee: Motional AD LLC, Boston, MA (US)

( * ) Notice: Subject to any disclaimer, the term of this patent is extended or adjusted under 35 U.S.C. 154(b) by 281 days.

(21) Appl. No.: 17/218,007

(22) Filed: Mar. 30, 2021

(65) Prior Publication Data
US 2022/0324464 A1 Oct. 13, 2022

(51) Int. Cl.
*B60W 40/12* (2012.01)
*B60W 60/00* (2020.01)
*G06N 5/04* (2023.01)
*G06N 7/01* (2023.01)
*G06N 20/00* (2019.01)
*G07C 5/08* (2006.01)

(52) U.S. Cl.
CPC ............ *B60W 40/12* (2013.01); *B60W 60/00* (2020.02); *G06N 5/04* (2013.01); *G06N 7/01* (2023.01); *G06N 20/00* (2019.01); *G07C 5/0808* (2013.01); *G07C 5/085* (2013.01)

(58) Field of Classification Search
CPC .. B60W 40/12; B60W 60/00; B60W 60/0011; B60W 30/10; B60W 40/02; B60W 2050/0005; B60W 2556/50; G06N 20/00; G06N 7/01; G06N 5/04; G07C 5/0808; G07C 5/085; G06F 11/3688; G06F 11/3684; G06F 30/27; G01M 17/007; G05B 23/0227; G05D 1/0088; G05D 1/0212; G05D 2201/0213
See application file for complete search history.

(56) References Cited

U.S. PATENT DOCUMENTS

| | | |
|---|---|---|
| 2018/0074501 A1 | 3/2018 | Boniske et al. |
| 2019/0129831 A1 | 5/2019 | Goldberg |
| 2019/0179738 A1 | 6/2019 | Hawthorne et al. |
| 2021/0049243 A1 | 2/2021 | Venkatadri |
| 2021/0216076 A1 * | 7/2021 | Nayak ................. G05D 1/0088 |
| 2021/0294944 A1 * | 9/2021 | Nassar ................. B60W 50/00 |
| 2021/0387643 A1 * | 12/2021 | Hari .................... B60W 30/095 |
| 2022/0198096 A1 * | 6/2022 | Danna ................. G06F 11/3684 |
| 2022/0207208 A1 * | 6/2022 | Shen .................... G06F 30/20 |
| 2022/0292377 A1 * | 9/2022 | Benedetti ............. G06N 20/10 |

FOREIGN PATENT DOCUMENTS

| | | |
|---|---|---|
| KR | 10-2015-0016381 | 2/2015 |
| KR | 10-1938064 | 1/2019 |
| KR | 10-2020-0085363 | 7/2020 |
| WO | WO-2022133090 A1 * | 6/2022 |

OTHER PUBLICATIONS

Campos et al., "Entropy-based test generation for improved fault localization," 2013 28th IEEE/ACM International Conference on Automated Software Engineering (ASE), Nov. 11, 2013, 257-67.
Yang et al., "Information gain of black-box testing," Formal Aspects of Computing, Jul. 2011, 23(4):513-39.
Krause et al., "Near-optimal Nonmyopic Value of Information in Graphical Models", Carnegie Mellon University, 8 pages, 2005.

* cited by examiner

Primary Examiner — Jelani A Smith
Assistant Examiner — Alyssa Rorie
(74) Attorney, Agent, or Firm — Fish & Richardson P.C.

(57) ABSTRACT

In an example method, a computer system receives first data representing a plurality of scenarios for estimating a performance of a vehicle in conducting autonomous operations. Further, the computer system determines, for each of the scenarios: (i) a first metric indicating an observed performance of the vehicle in that scenario, where the first metric is determined based on at least one rule, and (ii) a second metric indicating a degree of information gain associated with that scenario. The computer system selects a subset of the scenarios based on the first metrics and the second metrics, and outputs second data indicative of the subset of the scenarios.

12 Claims, 21 Drawing Sheets

SELECTING TESTING SCENARIOS FOR EVALUATING THE PERFORMANCE OF AUTONOMOUS VEHICLES

FIELD OF THE INVENTION

This description relates to a computer system for selecting testing scenarios for evaluating the performance of autonomous vehicles.

BACKGROUND

Autonomous vehicles (AVs) are typically tested in multiple scenarios to assess the behavior of the AV under a variety of conditions. Based on the results of the test, the AV can be modified and/or reconfigured to improve its behavior.

As an example, during a development process, the autonomous navigation capabilities of an AV can be tested in multiple scenarios, each representing a different combination of roads, obstacles, other vehicles, pedestrians, and traffic flows that the AV must traverse. Based on the results of the test, developers can modify and/or reconfigure the AV, such that the AV's autonomous navigation capabilities are improved.

DETAILED DESCRIPTION

Figure 1:
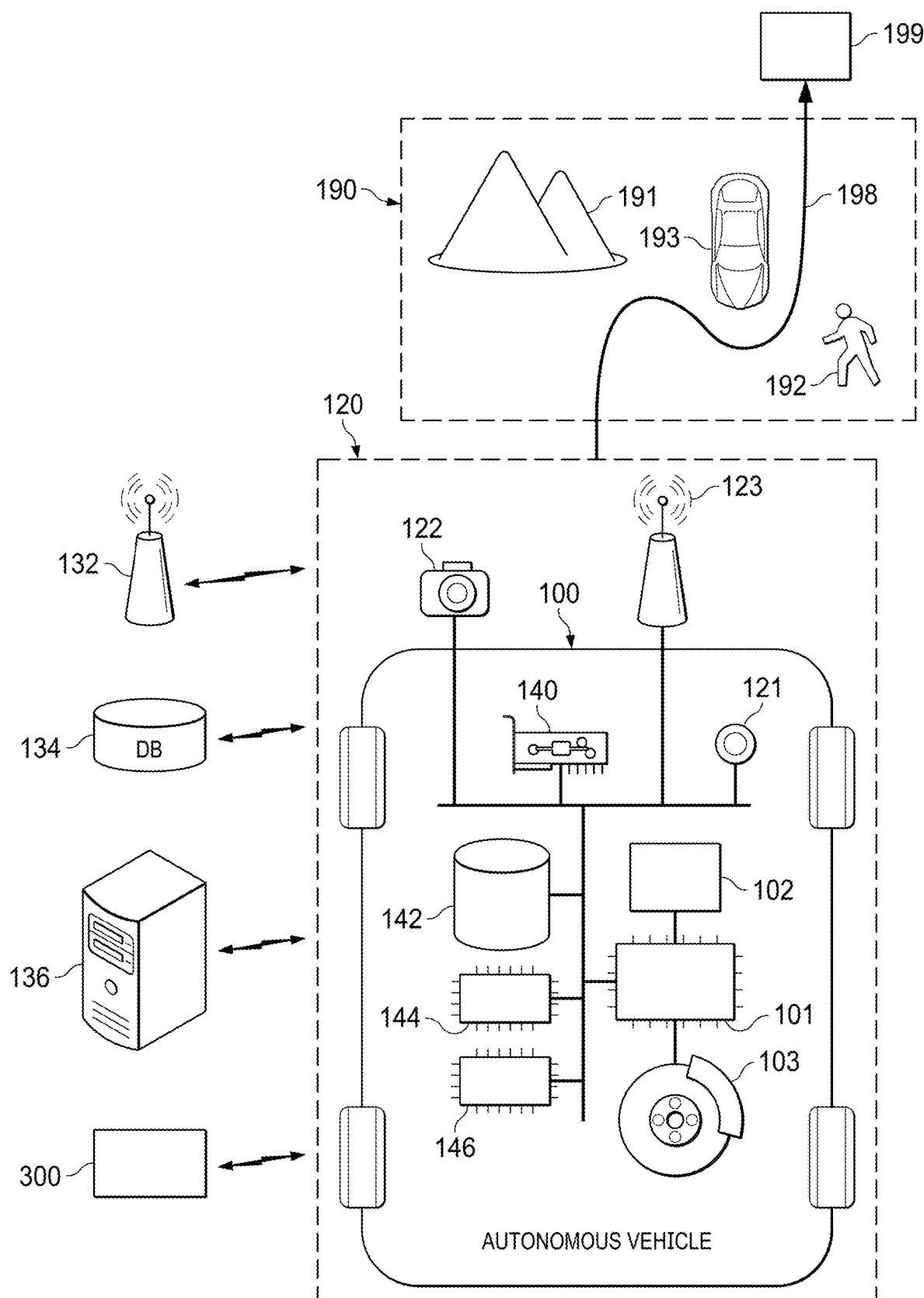
FIG. 1 shows an example of an AV having autonomous capability.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Planning
6. AV Control
7. AV Performance Evaluation System
8. Example Techniques for Selecting Scenarios Based on Information Gain General Overview An autonomous vehicle (AV) is typically tested in multiple scenarios to assess the behavior of the AV under a variety of conditions. For example, each scenario can specify a particular combination of roads, obstacles, other vehicles, pedestrians, traffic flows, and environmental conditions that an AV must traverse. If the AV behaves undesirably in one or more of the scenarios (e.g., if the AV is involved in a collision, violates the rules of the road, etc.), the AV's behavior can be modified, such that the AV is less likely to exhibit that behavior in the future.

In some cases, a set of scenarios can be selected to maximize the amount of information that is gained regarding the AV's performance, given a particular resource budget. For example, the performance of an AV can be expressed as a random variable having a particular probability distribution. Further, tests can be conducted using one or more scenarios, such that the entropy of that random variable is reduced. Scenarios that, when used to conduct a test, reduce an entropy of the random variable by a particular degree can be prioritized for selection over scenarios that reduce the entropy by a comparatively smaller degree. Further, the selected set of scenarios can be included in a standard battery of tests to assess the performance of the AV during development and validation of AV's autonomous navigation systems.

Some of the advantages of these techniques include improving the efficiently and speed by which the performance of an AV can be tested.

For example, in a traditional approach, an AV may be tested in a large number of scenarios in a brute force manner, without considering the amount of information that is gained from each testing scenario. As some scenarios may provide little probative value in assessing the performance of the AV and/or may be redundant in view of other scenarios, resources may be wasted in testing these scenarios. Further, as each successive scenario that is tested may offer diminishing returns in assessing the AV's performance, significant resources may be devoted to obtaining comparatively little useful information regarding the AV's performance.

In contrast, the techniques described herein enable the performance of an AV to be tested more quickly and efficiently. For example, a limited set of scenarios can be selected for testing, such that each of the scenarios in the set provides useful information for assessing the AV's performance. Further, the set can be selected to mitigate the effects of diminishing returns. Accordingly, the performance of the AV can be determined using a fewer number of test scenarios (e.g., compared to the number of test scenarios that might be employed in a brute force approach).

In some implementations, these techniques can accelerate the development and validation of an AV autonomous navigation systems (e.g., by enabling developers to identify undesirable behavior by the AV more quickly, such that the behavior can be rectified). Further these techniques can be used to determine whether an AV meets certain safety targets or requirements (e.g., a desired safety level).

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an AV (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

As used herein, "homotopy" means a subset of a set of constraints on a trajectory of an AV that the AV can adhere to while traversing a particular route.

As used herein, "feasible" means whether an AV can adhere to a constraint in a homotopy while traveling to a destination.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
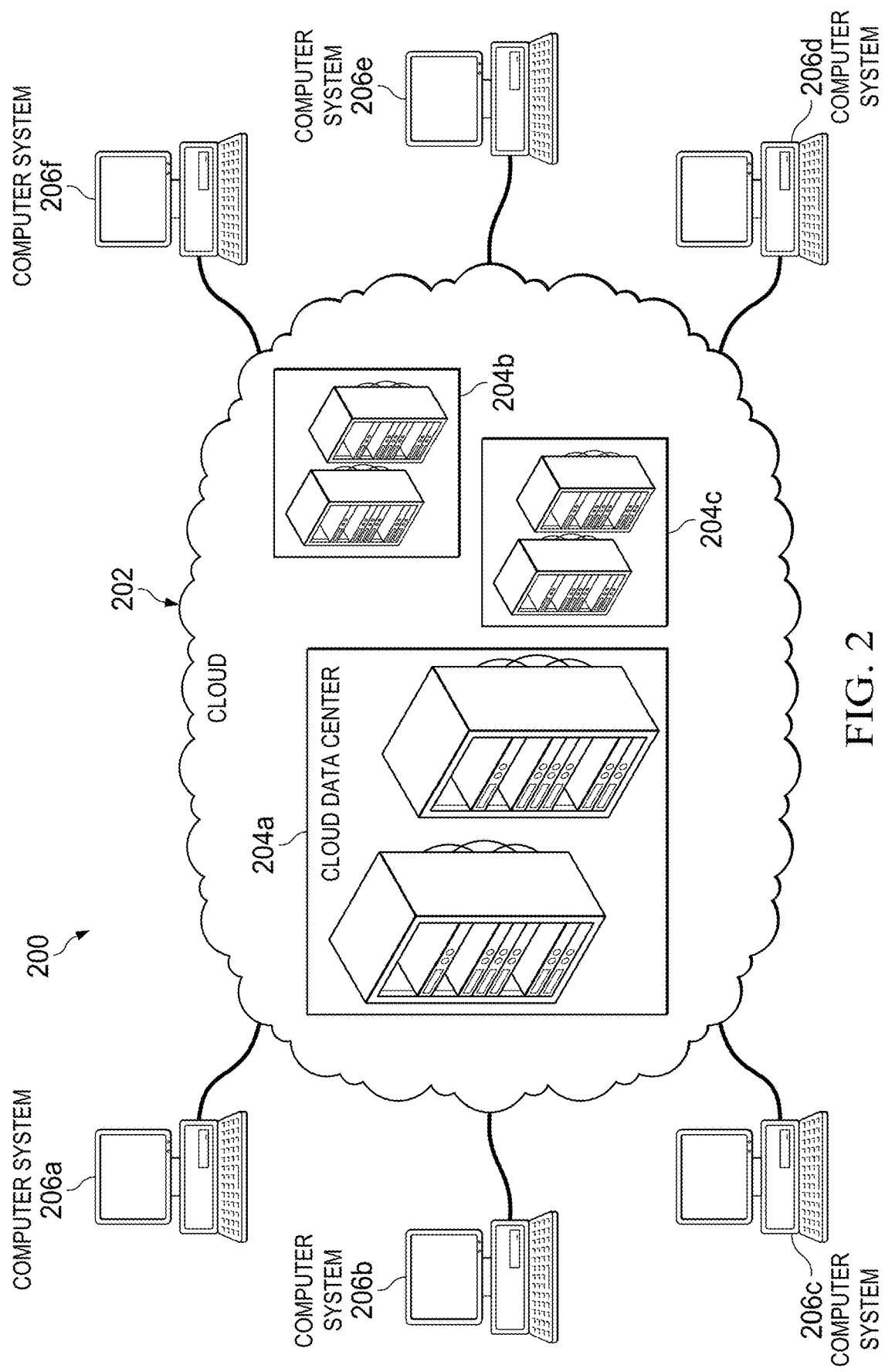
FIG. 2 shows an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
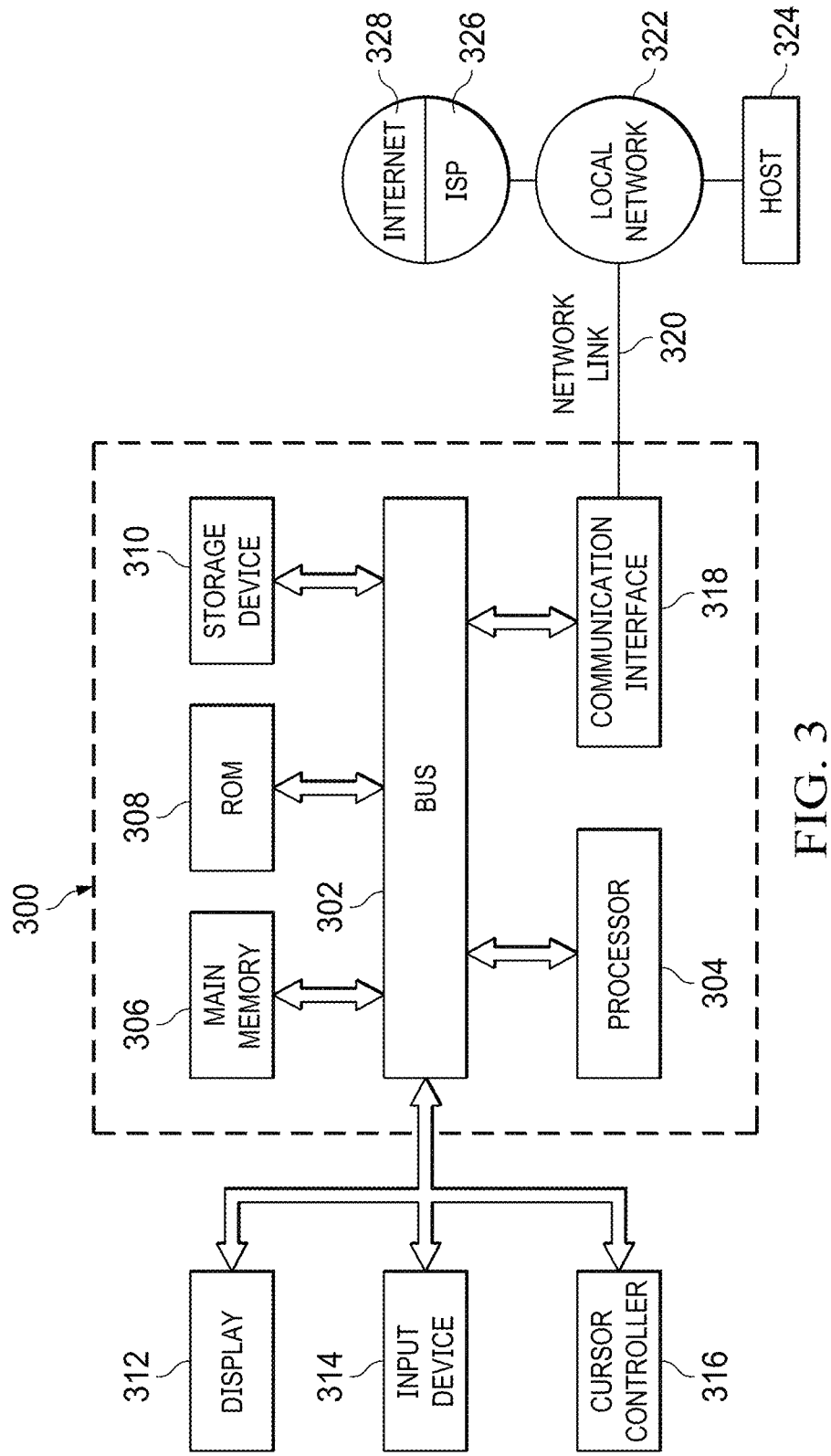
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
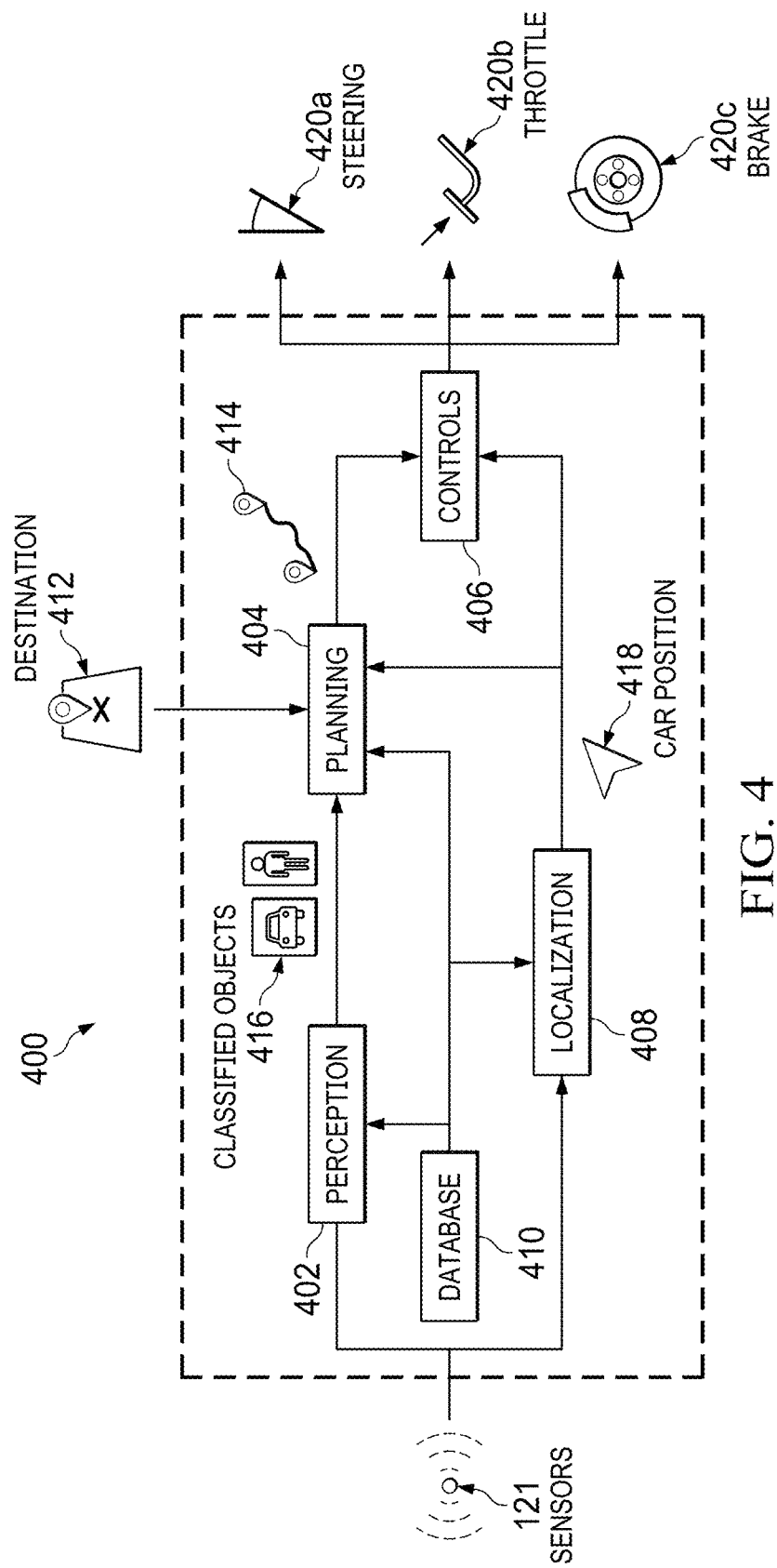
FIG. 4 shows an example architecture for an AV.

FIG. 4 shows an example architecture 400 for an AV (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition system) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

AV Inputs

Figure 5:
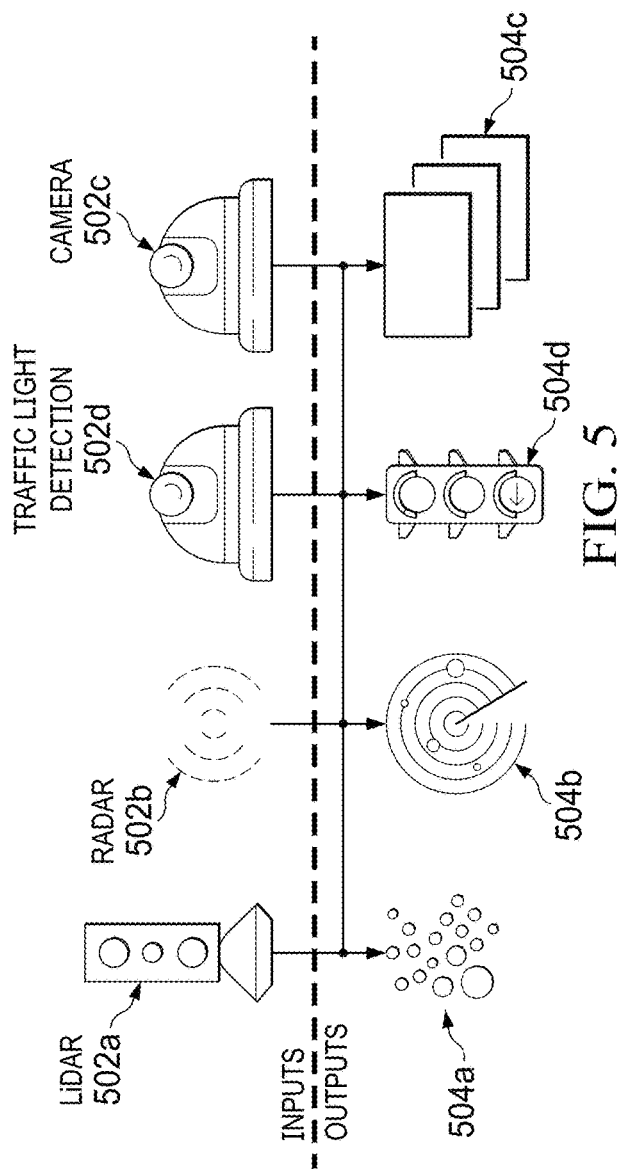
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
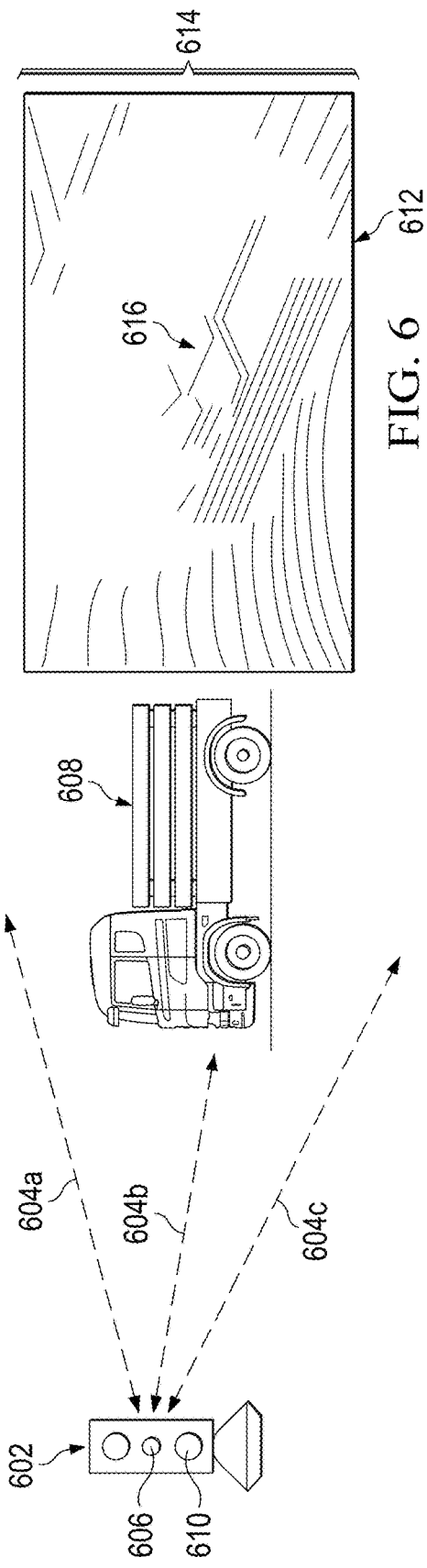
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
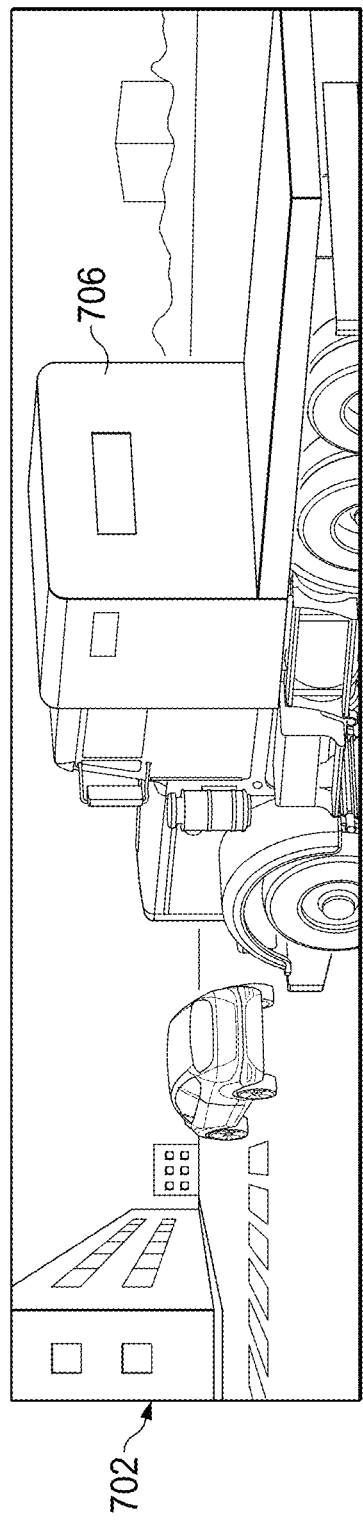
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
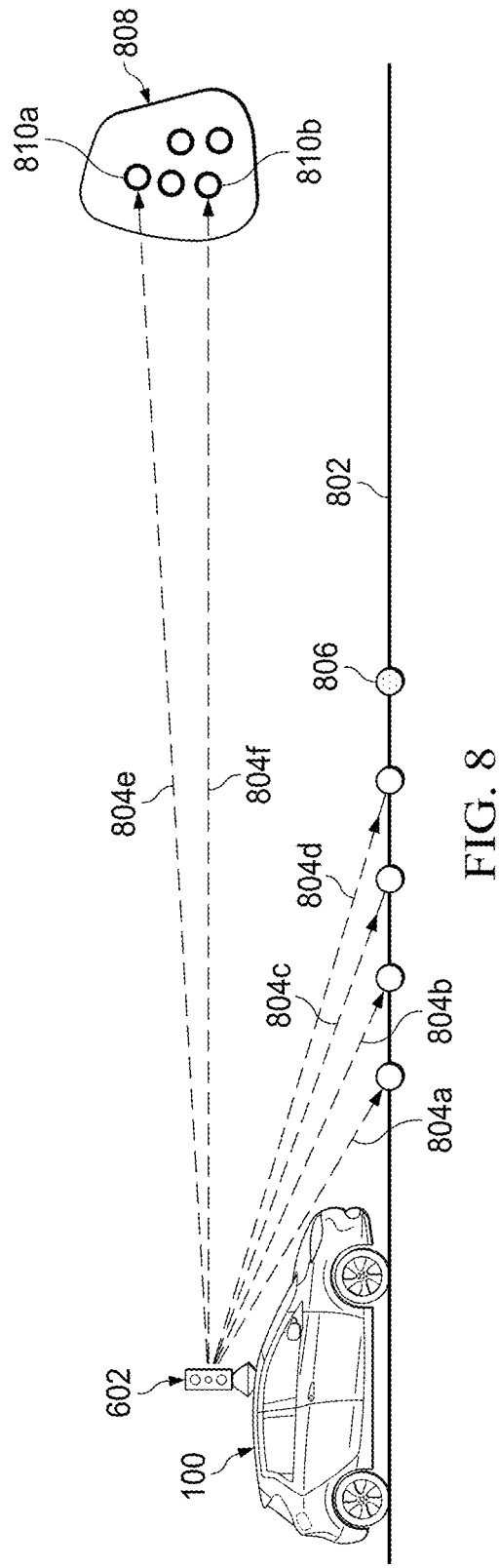
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
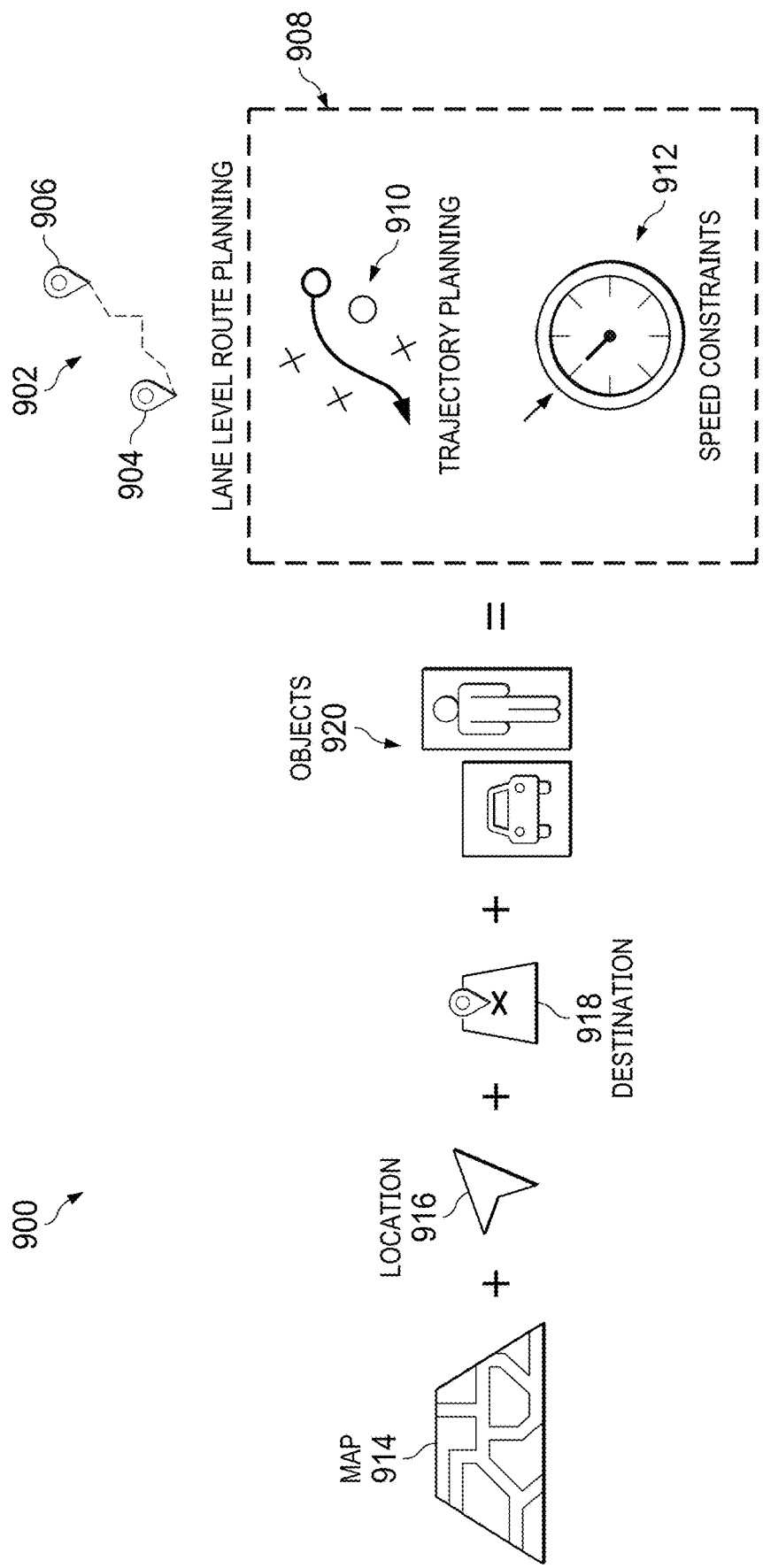
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 can limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning, also referred to as a "rulebook." Rules are specified using a formal language, e.g., using Boolean logic or linear temporal logic (LTL). In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
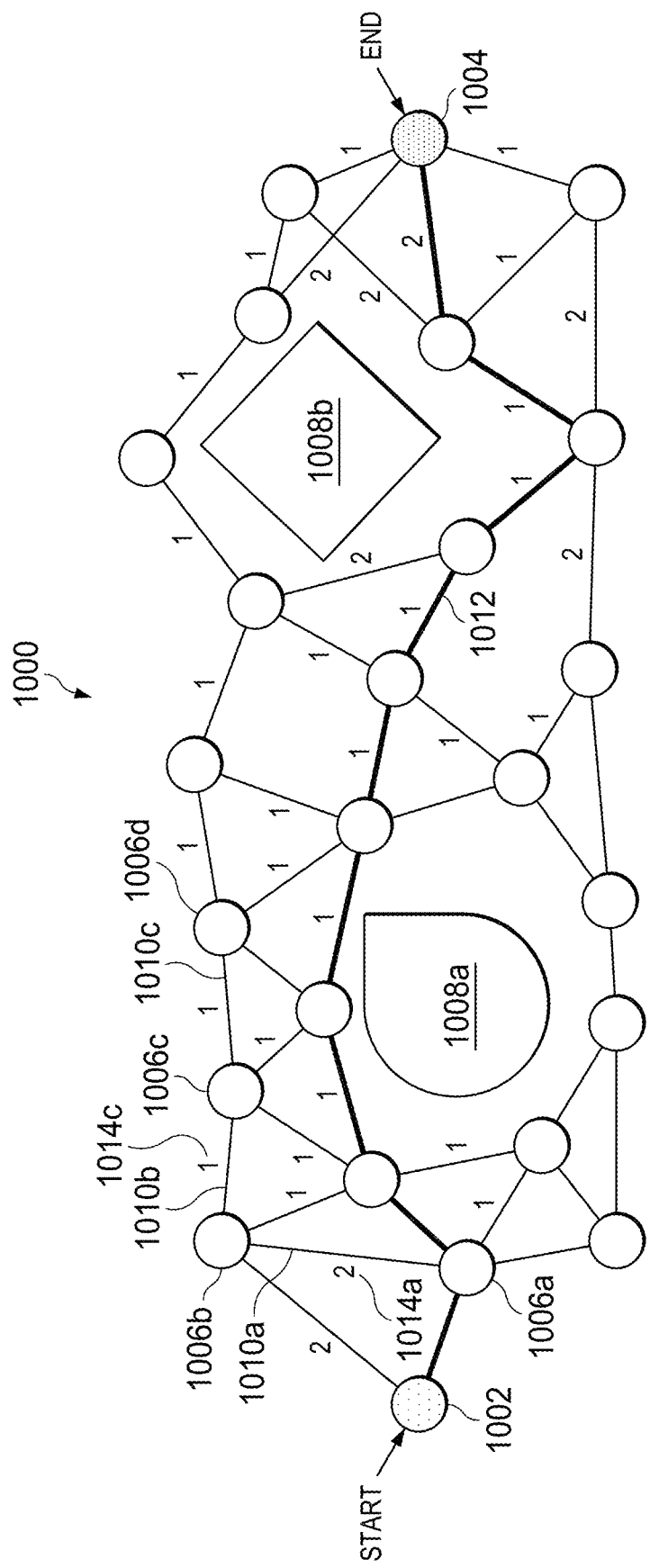
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 can be relatively large (e.g., in two different metropolitan areas) or can be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (i.e., the AV 100 travels between the two physical positions represented by the respective nodes). The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or map constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a can be twice the associated cost 1014b of the second edge 1010b. Other factors that affect time include expected traffic, number of intersections, speed limit, etc. Another typical resource is fuel economy. Two edges 1010a-b can represent the same physical distance, but one edge 1010a can require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

AV Control

Figure 11:
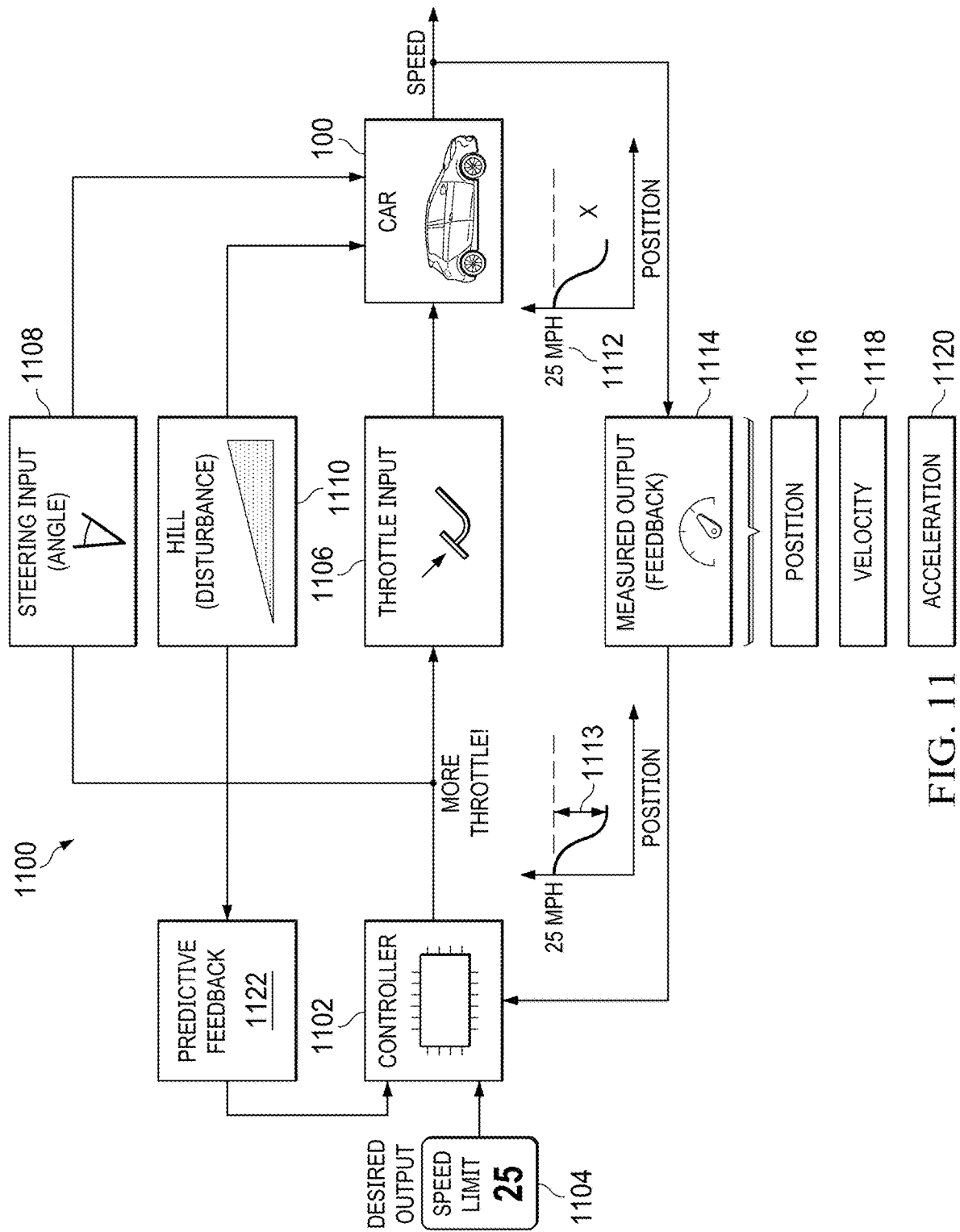
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
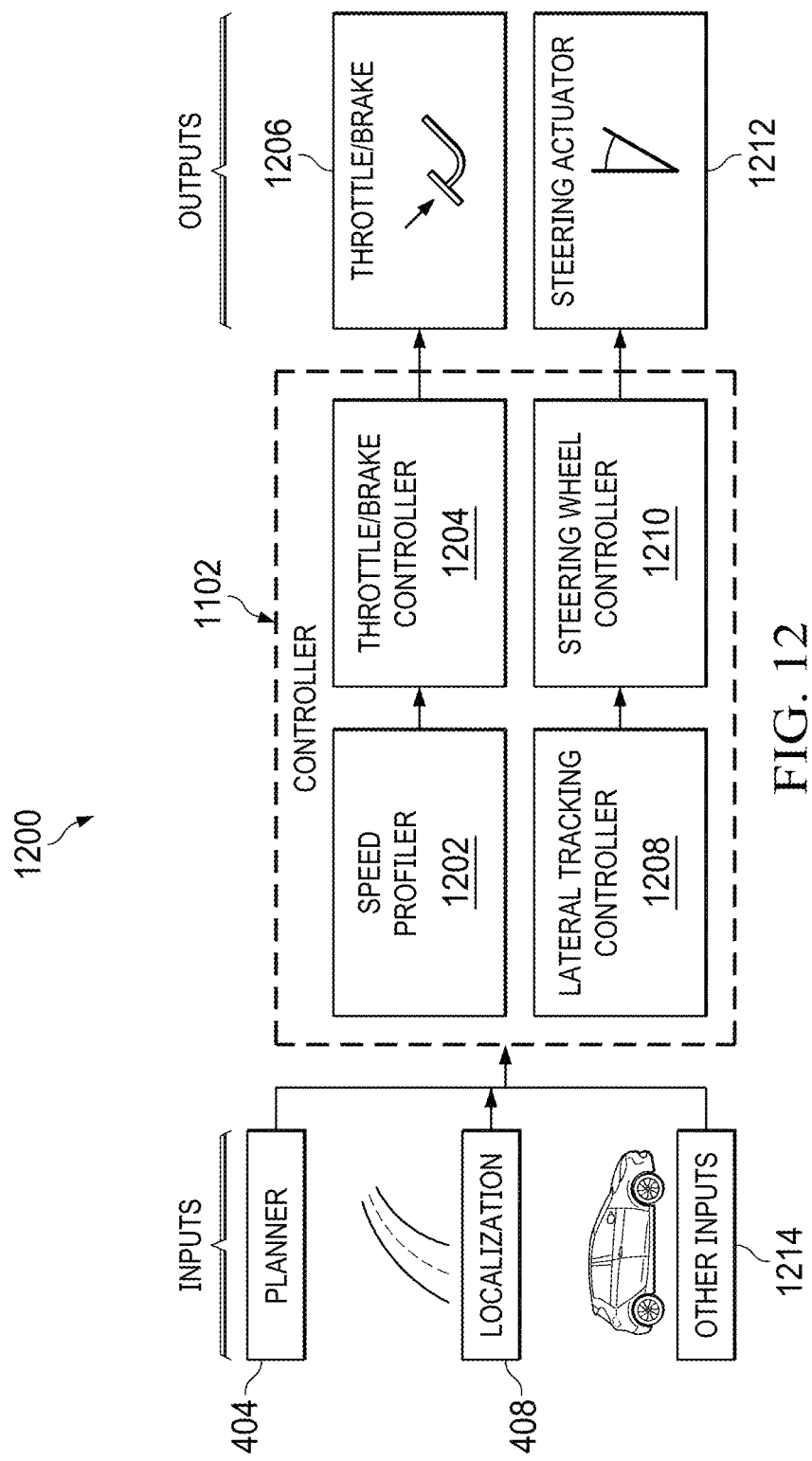
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Autonomous Vehicle Performance Evaluation System

A computerized performance evaluation system can be configured to assess the behavior of an AV in conducting autonomous operations. For example, an AV (e.g., an AV 100, as described with reference to FIGS. 1-12) can be configured to perform autonomous navigation operations, such as autonomously determining a path from one location to another and traversing that path. Further, a performance evaluation system can select a set of scenarios to test the safety, efficiency, and effectiveness of the AV in performing these operations. In some implementations, the performance evaluation system can perform at least some of the tests using one or more simulated scenarios to test the behavior of an AV in a computerized virtual environment. In some implementations, at least some of the tests can be performed using one or more real world scenarios to test the actual behavior of an AV in a physical environment.

Further, the AV can be modified and/or reconfigured based on the tests to improve the performance of the AV. For instance, one or more components of the AV, the configuration of those components, and/or the rulebooks of the AV can be modified based on the tests, such that the AV performs more safely, efficiently, and/or effectively in conducting autonomous operations. As an example, if the tests reveal that the AV behaves in an unsafe or otherwise undesirable manner under particular conditions, the AV can be modified and/or reconfigured to reduce the likelihood that the AV will behave in that manner under those conditions in the future.

In some implementations, a performance evaluation system can be used to as a part of an iterative prototyping and validation process for developing an AV. For example, the configuration of an AV can be alternatively validated and modified multiple times in succession to incrementally identify and correct unsafe or otherwise undesirable behavior by the AV.

Figure 13:
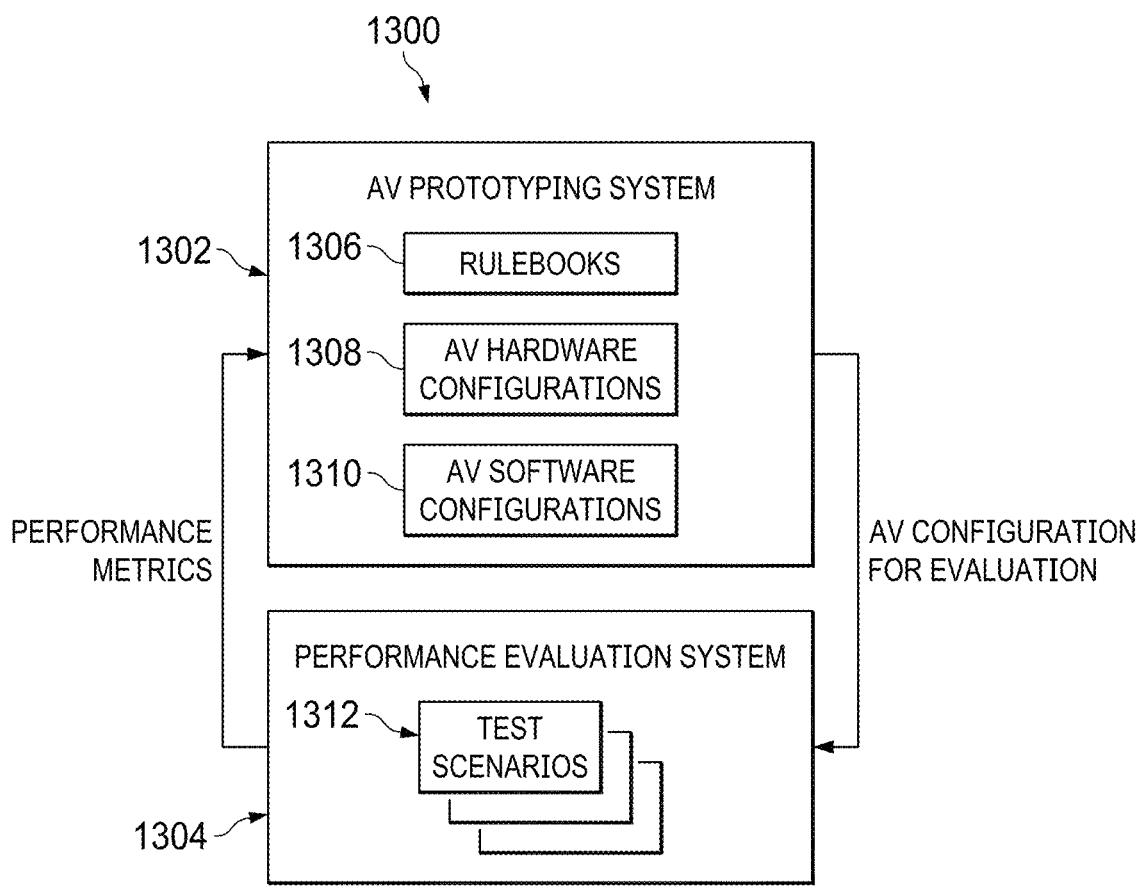
FIG. 13 shows an example system for iteratively prototyping an AV and validating the performance of the prototyped AV.

FIG. 13 shows an example system 1300 for iteratively prototyping an AV and validating the performance of the prototyped AV. The system 1300 includes an AV prototyping system 1302, and an AV performance evaluation system 1304.

The AV prototyping system 1302 can be implemented, at least in part, using one or more computer systems (e.g., a cloud server 136, a computing environment 200, and/or a computer system 300, as shown in FIGS. 1-3). During an example operation of the AV prototyping system 1302, the AV prototyping system 1302 determines a configuration for an AV. For example, the AV prototyping system 1302 can determine one or more rulebooks 1306, hardware configurations 1308, and/or software configuration 1310 for the AV.

As described above (e.g., with reference to FIGS. 4 and 9), a rulebook 1306 includes one or more rules that are used by a planning module (e.g., the planning module 404) to plan a path for the AV. For example, given a particular situation encountered by an AV, at least some of the rules of the rulebook can apply to that situation. The AV can perform one or more actions autonomously in accordance with the applicable rules. For instance, as described above (e.g., with reference to FIG. 11), the AV can steer, apply throttle, and/or brake in a particular manner in accordance with the rules.

As an example, the rulebook can include at least one traffic rule. For instance, traffic rules can specify that the AV obey traffic signals, drive with the flow of traffic, and maintain a legal speed under some or all conditions.

As another example, the rulebook can include at least one safety rule. For instance, safety rules can specify that the AV avoid collisions with other objects, maintain safe distance between other vehicles and pedestrians, and perform evasive maneuvers to avoid collisions or otherwise unsafe situations.

As another example, the rulebook can include at least one passenger comfort rule. For instance, passenger comfort rules can specify that the AV accelerate and decelerate smoothly and turn smoothly.

As another example, the rulebook can include at least one vehicle performance rule. For example, vehicle performance rules can specify that the AV remain with certain speed, braking, acceleration, and turning limitations of the vehicle.

In some implementation, the rulebook 1306 can also be used to evaluate the performance of the AV. For example, the rulebook 1306 can define a particular desired behavior of an AV (e.g., a combination of one or more traffic rules, safety rules, passenger comfort rules, passenger comfort rules, and/or any other rule specifying a desired behavior of the AV). The violation of rules in the rulebook 1306 can result in an increase of a violation metric (e.g., a numerical score representing the frequency by which the AV performed an undesirable operation and/or the severity of those violations). Although various rules of a rulebook are described above, these are merely illustrative examples. In practice, a rulebook can include one or more additional rules that specify a particular behavior for an AV under particular situations, either instead of or in addition to those rules described above.

The hardware configuration 1308 of the AV can include any arrangement of the physical components of the AV described herein. For example, a particular hardware configuration 1308 can specify that an AV include a certain number of each of the different types of physical components described herein (e.g., with reference to FIGS. 1-12), specify a certain location and/or an orientation for each of those physical components on the AV, specify a certain physical arrangement of each of the components and its constituent parts, and specify certain interconnections between those physical components and parts (e.g., electrical and/or communicative interconnections). As another example, a particular hardware configuration 1308 can also specify that an AV has certain physical characteristics (e.g., mass, dimensions, shape, center of gravity, etc.). As another example, a particular hardware configuration 1308 can also specify that an AV has certain performance characteristics (e.g., top speed, acceleration capabilities, braking compatibilities, turning capabilities, etc.).

The software configuration 1310 of the AV can include any arrangement of the software components described herein. For example, a particular software configuration 1310 can specify that an AV include a particular arrangement of software modules, each configured to perform certain sets of software-based operations described above (e.g., with reference to FIGS. 1-12). As another example, a particular software configuration 1310 can also specify that the software components of an AV retrieve certain types of data from one or more physical components and/or other software components, process that data in a particular manner, and transmit the processed data to other physical and/or software components.

In some implementations, the AV prototyping system 1302 can determine a configuration for an AV automatically (e.g., without input from a user). For example, the AV prototyping system 1302 can determine a set of rulebooks 1306, hardware configurations 1308, and software configurations 1310 for an AV using one or more machine learning and/or unsupervised learning processes.

In some implementations, the AV prototyping system 1302 can determine a configuration for an AV based at least in part on input from one or more users (e.g., one or more human designers). For example, a user can specify one or more rulebooks 1306, hardware configurations 1308, and/or software configuration 1310 for an AV. The AV prototyping system 1302 can determine a configuration for an AV based on the user's specifications.

Upon determining a particular configuration of the AV, the AV prototyping system 1302 provides the configuration to the AV performance evaluation system 1304 for testing. As described above, the AV performance evaluation system 1304 can test the AV (having the configuration specified by the AV prototyping system 1302) in multiple scenarios 1312 to assess the behavior of that configuration of the AV under a variety of conditions.

Figure 14A:
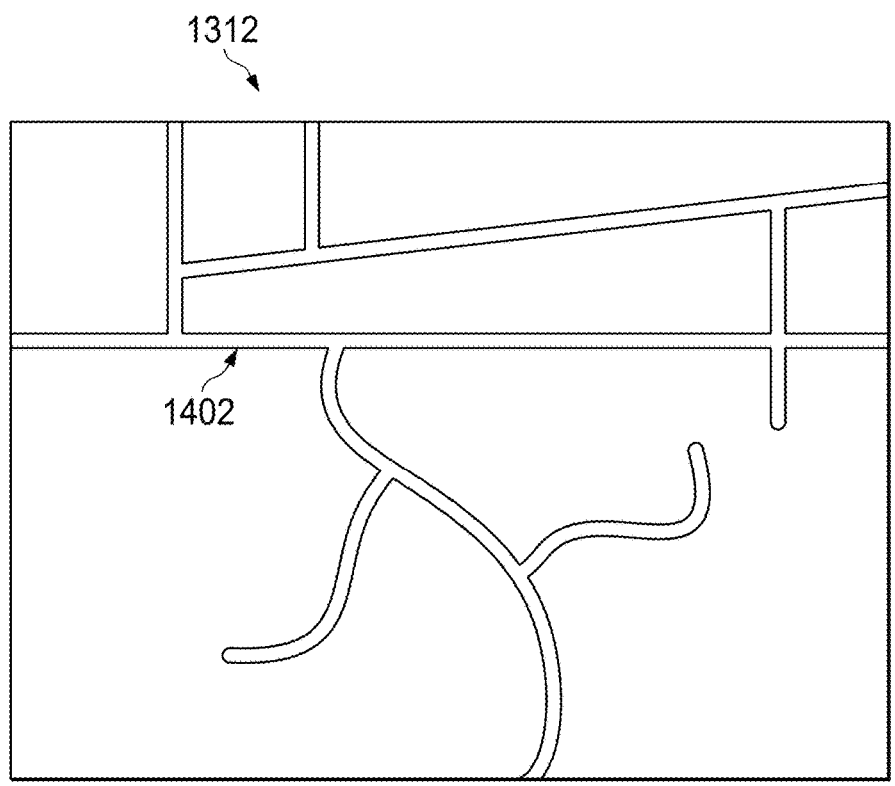
FIGS. 14A and 14B show a simplified example of a scenario for testing the performance of an AV.
Figure 14B:
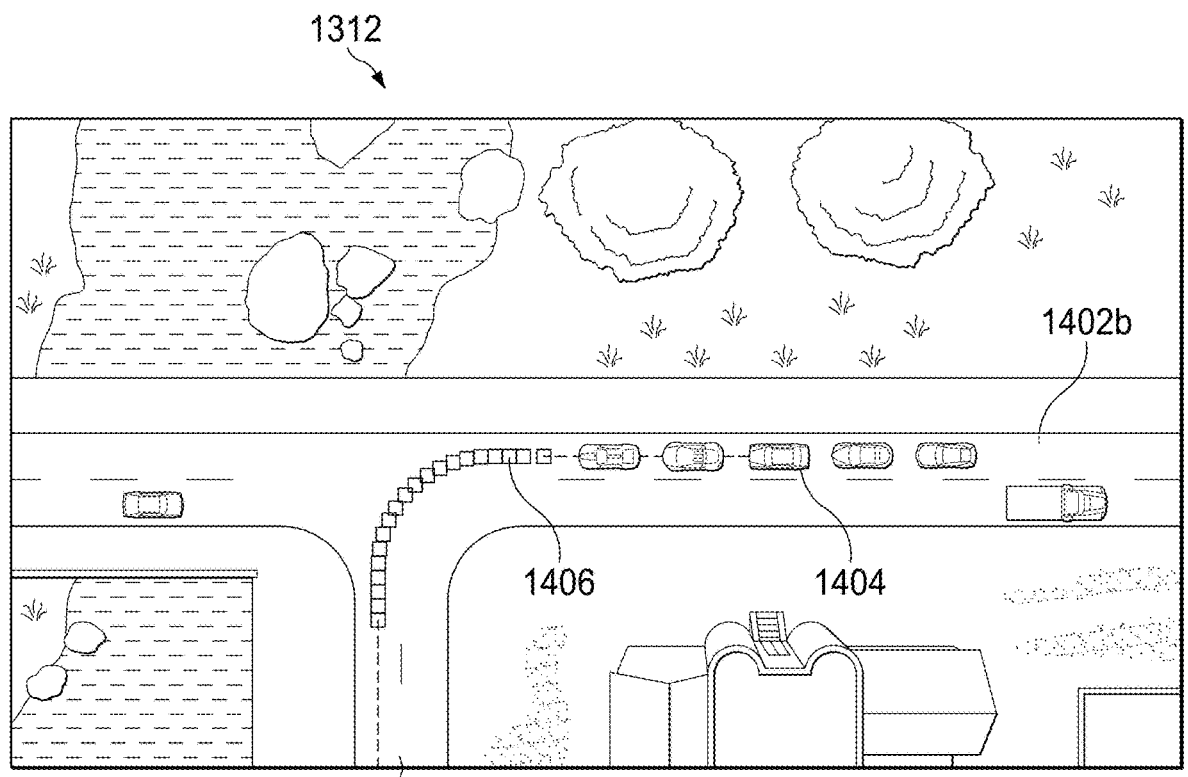

In some implementations, each of the scenarios 1302 can specify a particular combination of roads, obstacles, other vehicles, pedestrians, and traffic flows that an AV is to traverse. For instance, FIGS. 14A and 14B show a simplified example of a scenario 1312 for testing the performance of an AV. As shown in FIG. 14A, the scenario 1312 includes a network of interconnected roads 1402 that an AV can traverse, each having a particular traffic flow (e.g., a particular direction of traffic in each of the lanes of the roads). Further, as shown in FIG. 14B, the scenario 1312 includes several other vehicles 1404 traveling along those roads 1402. For example, the vehicles 1404 can be positioned at certain locations on the roads 1402, and can be travelling at particular speeds and directions along those roads 1402. Further, as shown in FIG. 14B, the scenario 1312 includes a specified objective 1406 for the AV. An objective can be, for example, a particular task or series of tasks that the AV is to perform in the scenario 1302. For instance, in the example shown in FIG. 14B, an objective 1406 can be a left hand turn from a road 1402b onto an intersecting road 1402a.

As described above, in some implementations, at least some of the scenarios 1302 can be simulated scenarios. For example, at least some of the scenarios 1302 can specify a computerized virtual environment for testing an AV, including one or more virtual roads, obstacles, other vehicles, pedestrians, traffic flows, and environmental conditions that an AV is to traverse. Further, at least some of the scenarios 1302 can specify an objective for the AV to perform within the virtual environment. Further, a computerized simulation can be used to predict the behavior of an AV in the virtual environment, given the configuration specified by the AV prototyping system 1302. In some implementations, computerized simulations can be performed at least in part by the AV performance evaluation system 1304.

As described above, in some implementations, at least some of the scenarios 1302 can be real world scenarios. For example, at least some of the scenarios 1302 can specify a physical environment for testing an AV. The AV can be physically deployed to that environment and instructed to perform autonomous operations within that environment. In some implementations, the results of the tests can be provided to the AV performance evaluation system 1304. For instance, the results of the tests can be manually input by a user (e.g., a human observer) and/or automatically input by a computer system that observed those tests.

The AV performance evaluation system 1304 outputs one or more performance metrics for the AV based on the tests.

In some implementations, the performance elevation system 1304 can output metrics indicating a number of times that the AV violated legal, safety and/or comfort constraints in each of the scenarios, and the severity of each of those violations.

As an example, the metrics can indicate the number of times that the AV came into contact with another object or pedestrian on the road. Further, the metrics can categorize the contact according to severity. For instance, coming into contact with a pedestrian could be considered more severe than coming into contact with a curb.

As another example, the metrics can indicate the number of times that the AV violated certain traffic rules or regulations, such as exceeding the speed limit of the roads, acting contrary to a traffic signal, or traveling against the flows of traffic of the roads. The metrics can also categorize the violations contact according to severity. For instance, exceeding a speed limit by a smaller degree could be considered less severe that exceeding a speed limit by a larger degree.

As another example, the metrics can indicate the number of times that the AV behaved in a manner that would cause discomfort for a passenger, such as accelerating, braking, and/or changing a direction of the AV beyond certain comfort limits. The metrics can also categorize the discomfort according to severity. For instance, exceeding an acceleration limit by a smaller degree could be considered less severe that exceeding an acceleration limit by a larger degree.

As another example, the metrics can indicate the number of times that the AV deviated from a previously planned route and the extent of those deviations (e.g., expressed in terms of added distance to the route and/or added travel time).

As another example, the metrics can indicate the number of times that the AV exceeded and/or was in danger of exceeding the performance limitations of the AV. For example, the metrics can indicate the number of times that the AV accelerated, braked, and/or turned in a manner that would exceed and/or was in danger the safety or design envelope of the AV. The metrics can also indicate the severity of these deviations. For example, the metrics can indicate the extent to which the AV exceeded the acceleration, braking, and turning capabilities of the AV, and/or how close the AV was exceeding those capabilities.

As another example, the AV performance evaluation system 1304 can output metrics indicating the amount of time that the AV needed to complete each of the scenarios. As another example, the AV performance evaluation system 1304 can output metrics indicating the average speed of the AV during each of the scenarios. As another example, the AV performance evaluation system 1304 can output metrics indicating the amount of resources (e.g., fuel and/or electrical power) that the AV consumed during each of the scenarios.

The AV performance evaluation system 1304 provides the one or more performance metrics to the AV prototyping system 1302. Based on the one or more performance metrics, the AV prototyping system 1302 can modify and/or reconfigure the AV to improve the performance of the AV. For example, the AV prototyping system 1302 can modify the rulebooks 1306, hardware configurations 1308, and/or software configurations 1310 of the AV such that the AV performs autonomous operations more safety, more efficiently, and/or more effectively.

The modified configuration for the AV can be evaluated using the AV performance evaluation system 1304 (e.g., as described above). This process can be performed multiple times in succession to iteratively improve the performance of the AV through successive incremental modifications and/or reconfigurations of the AV.

In some cases, the AV performance evaluation system 1304 can select a set of scenarios 1312 to maximize the amount of information that is gained regarding the AV's performance, given a particular resource budget. For example, the performance of an AV can be expressed as a random variable having a particular probability distribution. Certain scenarios 1312 that, when used to evaluate the performance of a AV, reduce an entropy of the random variable by a particular degree can be prioritized for selection over other scenarios 1312 that reduce the entropy by a comparatively smaller degree. Further, the selected set of scenarios 1312 can be included in a standard battery of tests to assess the performance of the AV during development and validation of AV's autonomous navigation systems.

Figure 15:
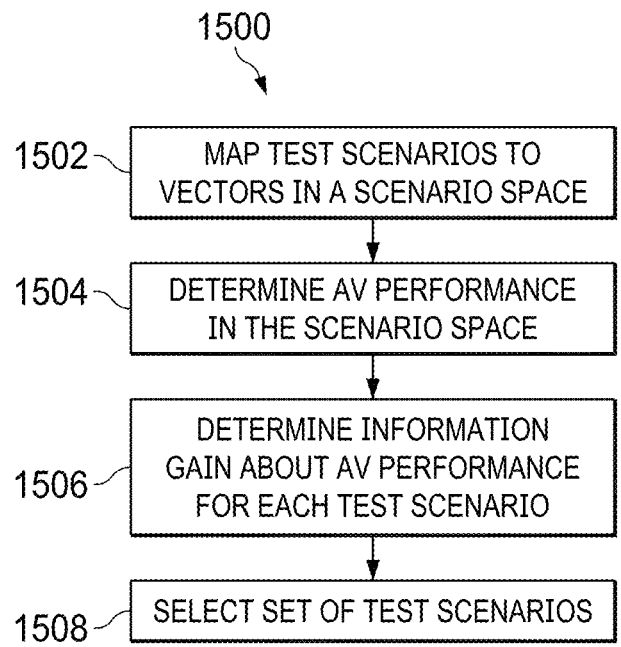
FIG. 15 shows an example process for selecting a set of scenarios for testing the performance of an AV.

FIG. 15 shows an example process 1500 for selecting a set of scenarios for testing the performance of an AV. The process 1500 can be performed, for example, by the AV performance evaluation system 1304 to select a set of scenarios 1312 from among a pool of candidate scenarios to test the performance of an AV.

According to the process 1500, a pool of candidate scenarios is identified. Further, each of those scenarios is mapped to one or more vectors in a scenario space (block 1502). As an example, each of the features of the candidate scenarios can correspond to a different dimension of the scenario space. The presence or absence of that feature in a particular candidate scenario can be expressed using a vector in the scenario space.

For example, at least some of the candidate scenarios can include the presence of a pedestrian crossing in front of the AV. Candidate scenarios having this feature can be represented by vectors that each include a particular value (e.g., a value of "1") in a first dimension of the scenario space. Candidate scenarios not having this feature can be represented by vectors that each include another value (e.g., a value of "0") in the first dimension of the scenario space.

As another example, at least some of the candidate scenarios can include the presence of other vehicles traveling in the same lane as the AV. Candidate scenarios having this feature can be represented by vectors that each include a particular value (e.g., a value of "1") in a second dimension of the scenario space. Candidate scenarios not having this feature can be represented by vectors that each include another value (e.g., a value of "0") in the second dimension of the scenario space.

As another example, at least some of the candidate scenarios can include the presence of other vehicles traveling in another lane as the AV. Candidate scenarios having this feature can be represented by vectors that each include a particular value (e.g., a value of "1") in a third dimension of the scenario space. Candidate scenarios not having this feature can be represented by vectors that each include another value (e.g., a value of "0") in the third dimension of the scenario space.

As another example, at least some of the candidate scenarios can include vehicles traveling in the same direction as the AV. Candidate scenarios having this feature can be represented by vectors that each include a particular value (e.g., a value of "1") in a fourth dimension of the scenario space. Candidate scenarios not having this feature can be represented by vectors that each include another value (e.g., a value of "0") in the fourth dimension of the scenario space.

As another example, at least some of the candidate scenarios can include vehicles traveling in the opposite direction as the AV. Candidate scenarios having this feature can be represented by vectors that each include a particular value (e.g., a value of "1") in a fifth dimension of the scenario space. Candidate scenarios not having this feature can be represented by vectors that each include another value (e.g., a value of "0") in the fifth dimension of the scenario space.

Although example features and dimensions are describe above, these are merely illustrative examples. In practice, a vector space can include any number of dimensions representing any number of different features of the candidate scenarios.

Further, the performance of an AV is determined in the scenario space (block 1504). For example, using the performance evaluation system 1304, the performance of the AV can be tested in some or all of the candidate scenarios. The result of the tests can be expressed using one or more performance metrics (e.g., as described above).

Further, the amount information that is gained regarding the performance of the AV is determined for each of the tested scenarios (block 1506). In some implementations, the performance of an AV can be expressed as a random variable having a particular probability distribution. The amount of information that is gained can refer to and/or correlate with a particular degree of entropy reduction in that variable.

Further, a set of scenarios is selected from among the candidate scenarios based on the amount of information that is gained by each of the tested scenarios (block 1508). As an example, certain candidate scenarios that reduce an entropy of the random variable by a particular degree can be prioritized for selection over other candidate scenarios that reduce the entropy by a comparatively smaller degree. The selected set of scenarios can be included in a standard battery of tests to assess the performance of the AV during development and validation of AV's autonomous navigation systems.

Figure 16:
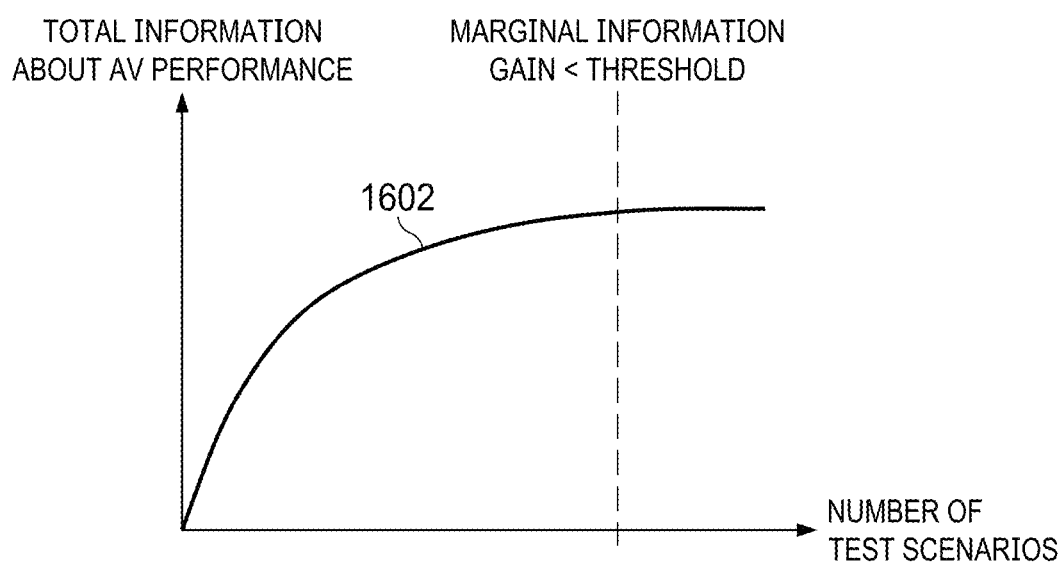
FIG. 16 shows a simplified relationship between a number of scenarios that are tested and a total amount of information that is obtained regarding the performance of an AV.

This process can be beneficial in mitigating the effects of diminishing returns when testing the performance of an AV. For example, FIG. 16 shows a simplified relationship between a number of scenarios that are tested (horizontal axis) and a total amount of information that is obtained regarding the performance of an AV (vertical axis), represented as a curve 1602. As the number of tested scenarios increases (e.g., from left to right), the total information regarding the performance of the AV also increases (e.g., from bottom to top). However, the marginal amount of information that is obtained decreases with each additional test, represented by an incrementally decreasing slope of the curve 1602 from left to right. When the marginal amount of information that is gained is sufficiently low (e.g., less than a particular threshold amount), testing can be discontinued. Accordingly, the benefit of performing each additional test can be balanced against the resource cost that is associated with performing that test.

In some implementations, this process enables the performance of an AV to be tested more quickly and efficiently. For example, a limited set of scenarios can be selected for testing, such that each of the scenarios in the set provides useful information for assessing the AV's performance. Further, as described above, the set can be selected to mitigate the effects of diminishing returns. Accordingly, the performance of the AV can be determined using a fewer number of test scenarios (e.g., compared to the number of test scenarios that might be employed in a brute force approach).

In some implementations, the threshold value that is used to determine when to discontinue testing can be selected empirically. For example, the threshold value can be a tunable value that enables a user to balance a desire to obtain information regarding the performance of an AV against an expenditure of resources to obtain that information. For instance, if it is desirable to gain a greater amount of information regarding the performance of an AV, even if a greater amount of resources would be expended for each additional test that is performed, the threshold value can be set of a relatively lower value (e.g., such that a greater number of tests are performed using a greater number of scenarios until the threshold value is reached). As another example, if it is desirable to expect resources in a more conservative manner, the threshold value can be set to a relatively higher value (e.g. such that a fewer tests are performed using fewer scenarios until the threshold value is reached).

In some implementations, the number of scenarios that are selected for testing can be constrained according to a budget metric. For example, each candidate scenario can have an associated resource cost for performing a test using that candidate scenario. Candidate scenarios can be selected such that the resource cost for the selected scenarios does not exceed a particular budget. As an example, if each of the candidate scenarios as a resource cost of one unit and the total budget is to be no greater than 10 units, up to 10 candidate scenarios can be selected for testing. This can be useful, for example, in limiting the resources that would be expended in testing the performance of an AV. In some implementations, the budget can be selected empirically.

In some implementations, candidate scenarios can be grouped into multiple different groups based on similarities and/or differences between the candidate scenarios. Further, candidate scenarios can be selected for testing based on those groups.

As described above, each candidate scenario can be represented by a respective vector in scenario space. Based on similarities and/or differences between the vectors, the candidate scenario can be clustered into one or more groups. In general, candidate scenario within a common group can be more similar to each other, whereas candidate scenarios within different groups can be less similar to each other. Candidate scenarios can be selected from the groups in a manner that maximizes (or otherwise enhances) the amount of information that would be gained by performing tests using the selected scenarios. In some implementations, candidate scenarios can be selected from the groups according to a greedy algorithm (e.g., a problem-solving heuristic that makes a locally optical choice at each of several stages of a selection process).

In some implementations, candidate scenarios can be grouped according to hierarchical structure. For example, each level of the hierarchical structure can represent a relative similarity between nodes of the hierarchical structure. Nodes sharing a common node that that is located at a higher level of the hierarchical structure (e.g., nearer the "root" of the hierarchy) can indicate that the nodes have a lesser degree of similarity to one another. In contrast, nodes sharing a common node that that is location at a lower level of the hierarchical structure can indicate that the nodes have a greater degree of similarity to one another. Candidate scenarios can be selected from the hierarchical in a manner that maximizes (or otherwise enhances) the amount of information that would be gained by performing tests using the selected scenarios. In some implementations, candidate scenarios can be selected from the hierarchical structure according to a greedy algorithm. In some implementations, the hierarchical structure can be a Bayesian hierarchical model. In some implementations, candidate scenarios can be grouped according to other graphical representation, such as a Bayesian network, a factor graph, a Hidden Markov Model (HMM), or any other structure.

Example Techniques for Selecting Scenarios Based on Information Gain

As described above, an AV performance evaluation system 1304 can select scenarios for testing the behavior of an AV based on the amount of information that would be gained by testing each of the scenarios. Example techniques for selecting scenarios based on information gain are described below.

In general, a hierarchical statistical model can be used to represent AV performance. Further, a set of scenarios can be selected to evaluate this performance across Operational Design Domains (ODDs). The hierarchical structure can support the reuse of information from one ODD to the next, and can mitigate the sensitivity of the performance estimation to event frequencies, as they are not directly used. Further, a criterion can be used to assess the value of testing on a specific scenario, and the example sampling techniques described herein can provide near-optimality with respect to this criterion.

Figure 17:
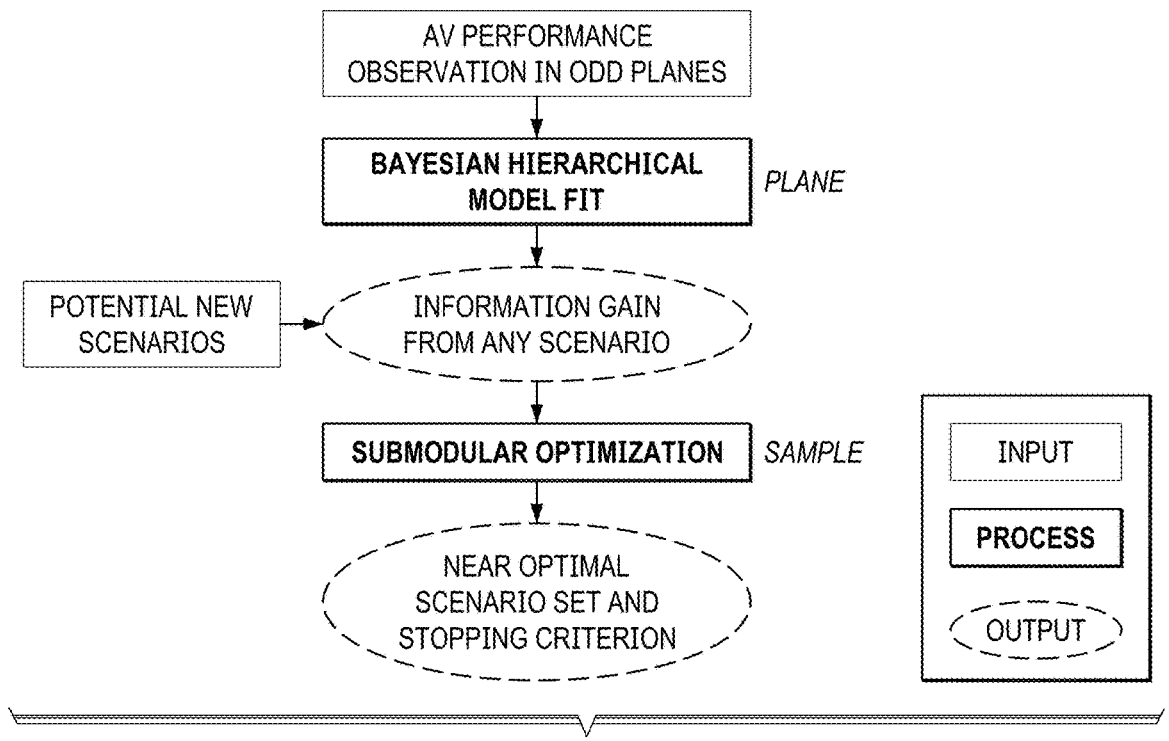
FIG. 17 shows a representation of the Bayesian Hierarchical Model

In general, the selection process can include two steps, as summarized in FIG. 17. First, AV performance is modeled as a Bayesian Hierarchical Model. The emergence of formal rules of expected AV behavior, and attached violation metrics, facilitates the quantitative assessment of AV performance in any scenario. The factors that compose an ODD, such as the region of operation, can be used as levels in the hierarchy. In some implementations, the region can be a particular town, city, county, state, country, or some portion thereof. This representation leverages ODD factors as units of analysis, each with just a few observations. Indeed, it becomes difficult to observe scenarios corresponding to an ODD where all the factors are fixed, for example blue stop signs with a specific road curvature with a high rain density and low communication reliability. The number of qualifying observations decreases with the amount of fixed factors. In some implementations, this part of the process can be called the plane, because each level of the hierarchy can effectively constitute a hyperplane.

Second, inference can be performed on AV performance through this Bayesian Hierarchical Model. This allows the computation of information gain on the system provided by each new scenario, which can be used as a metric to evaluate the relevance of a new scenario and of a scenario set. The Bayesian Hierarchical model provides conditional independence properties between AV performance in different scenario space hyperplanes, causing the information gain to be submodular. This means that the information gain has a diminishing returns property. For example, as more scenarios are added, the increase in information becomes marginal. Thus, the greedy algorithm for submodular optimization can be leveraged to provide a scenario set to provide a near maximal level of information gain (sample). A stopping criterion (e.g., for discontinuing the selection of additional scenarios for the scenarios set) can be defined, such that selection is discontinued when the information gain does not grow anymore given a statistical confidence level.

To demonstrate the effectiveness of this process, an experiment was conducted by simulating an AV on routes from the 2020 CARLA challenge (CARLA Team). The results of this experiment show a plateauing information gain with a 90% confidence after only testing about 7% of the scenario space, whereas another technique (Latin Hypercube Sampling) explores 33% more scenarios to obtain the same quantity of information.

As described below, AV performance can be presented using a Bayesian Hierarchical Model, relying on quantitative evaluations of behavioral rules.

Further, information gain can be uses as a metric to quantify the relevance of a new scenario or set of scenarios Further, the greedy algorithm for submodular optimization can be used as a part of a selection algorithm (e.g., to provide near-optimality guarantees).

Further, a stopping criterion can be used to contain the size of the scenario set. Specifically, the selection of additional scenarios for the scenarios set can be discontinued when the information gain is plateauing, with a given statistical confidence.

Example Process

A. Plane

Let $\mathcal{V}$ be the scenario space to sample from. A scenario $S \in \mathcal{V}$ contains information about what is happening in the environment, outside of the system under test. As assumption can be made that S can be characterized as an element of $\mathbb{R}^n$ where n is the number of features in the environment. These features can be based on scenario ontologies, or industry proposals for ODD definitions. For a more pointed search, these coordinates could also correspond to the parameters of a specific logical scenario. The scenarios considered can be generated in simulation or in real-life settings. Assuming n features to describe a scenario such as cloud density, presence of a construction site, or number of dynamic agents, and k potential values for each feature, $|\mathcal{V}|=k^n$. For 50 features that could each take 6 values, this represents about $10^{10}$ scenarios. Although simulation allows testing an AV for the fraction of the cost of a track test, generating such a high number of scenarios may nevertheless require substantial computational capabilities.

Further, AV performance can be on any given scenario. The Rulebooks framework provides rules, associated with violation metrics, to evaluate AV performance in a scenario according to an explicit behavior specification. Indeed, AV performance can be influenced by many different notions, such as traffic laws, courteous driving manners, or ride comfort. And even though this example experiment uses the number of collisions, this technique is compatible with the use of any performance metric. Once a specific rule has been translated into a formal logic statement, any trajectory in any scenario can be evaluated and given a violation score.

The performance of the AV in the scenario space can be defined as $X_\mathcal{V}=\{X_i, i\in \mathcal{V}\}$, where $X_\mathcal{V}$ is a random variable. The goal is to sample scenarios which will provide the most information about the distribution of $X_\mathcal{V}$. Thus some structure may need to be established behind the distribution of $X_\mathcal{V}$. Indeed, if performance were to be completely chaotic, there would be no relation between rule violations in two different scenarios, none of the learnings from one scenario would be generalizable to another scenario, and every single scenario may need to be tested.

Figure 18:
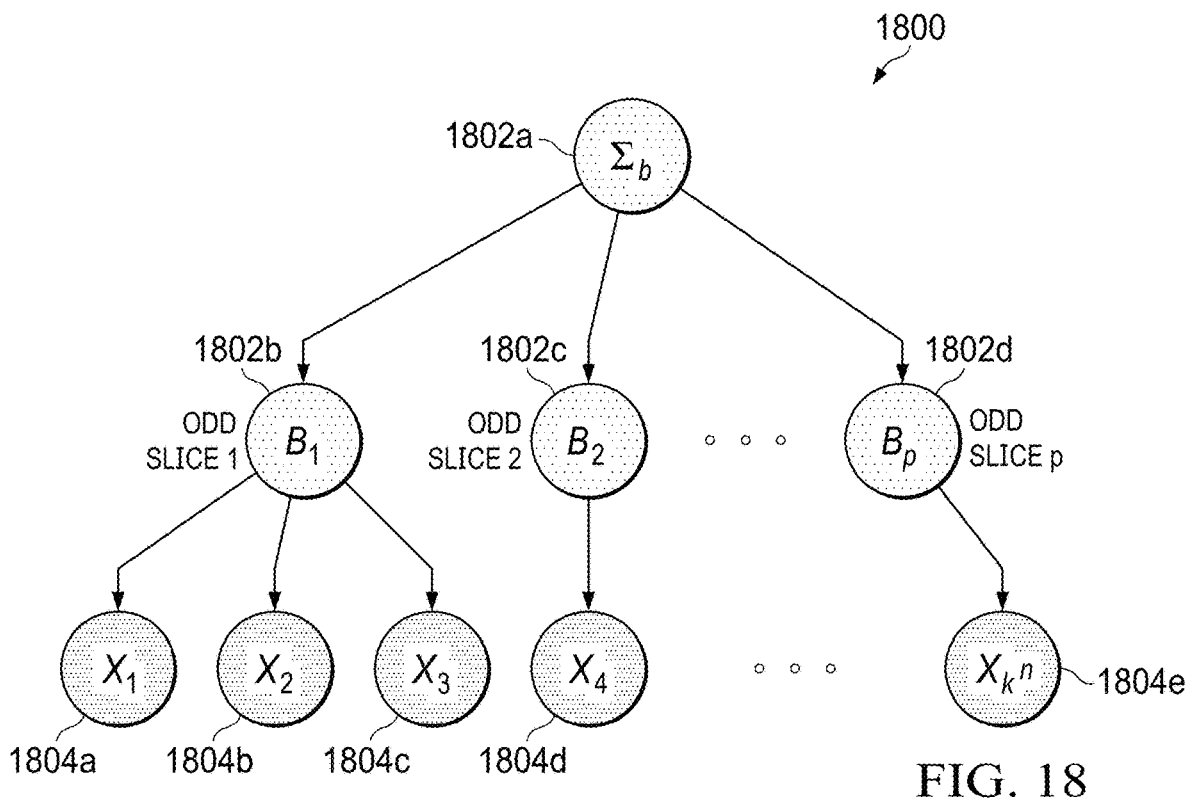
FIG. 18 shows an example probability distribution of a random variable X.

In this example, an assumption is made that the Bayesian Hierarchical Model can be fitted to observable AV performance. FIG. 18 shows a representation of the Bayesian Hierarchical Model 1800. The lightly shaded nodes 1802a-1802d represent unobserved variables, and the darkly shaded nodes 1804a-1804e represent the random variables of interest.

Because parameters are sampled from probability distributions, lower case letters are used to designate both the random variables and their realizations for the parameters and hyperparameter. A hyperplane of the scenario space is defined as the set of scenarios for which one feature, such as town of operation is fixed. Therefore the assumption can be reformulated in the following manner: for p hyperplanes of the scenario space, an assumption can be made that there exists $b_1, \ldots, b_p$ and $\sigma$ such that:

$$X_i|b_p, \sigma \sim P(x_i|b_p, \sigma) \quad \text{(Eqs. 1)}$$

$$b_p|\sigma \sim P(b_p|\sigma)$$

$$\sigma \sim P(\sigma) \quad \text{(Eqs. 1)}$$

where $\sigma$ is the hyperparameter with hyperprior $P(\sigma)$, $b_1, \ldots, b_p$ are generated from a population with distribution governed by the hyperparameter $\sigma$, and $P(x_i|b_p, \sigma)$ is the likelihood of AV performance, with $P(b_p, \sigma)$ as its prior distribution. Adequate priors and hyperpriors can be chosen as a part of the model fitting process.

The interpretation of such a model is the following: AV performance is assumed to follow a distribution of parameter $b_p$ in the hyperplane p. This distribution can be inferred from data observation, as shown in the Experiment and Results section below, or from expert knowledge. When testing in scenarios that take place in this town p, samples $x_i$'s are effectively obtained from this distribution. In a different town k, the shape of the distribution of AV performance will be the same, but the parameter $b_k$ will likely be different, as $b_k$, $b_p$ are themselves sampled from $P(\sigma)$. For example, AV's number of vehicle clearance violation over a scenario could follow a lognormal distribution, but the average could be higher in a dense town with more traffic than in a town with larger roads and fewer vehicles.

The quality of the scenario set determined by this example technique depends on the quality of the fit of the Bayesian Hierarchical Model to AV performance. A poor fit of parameters and hyperparameters would lead to a poor estimation of the information gain and the algorithm would therefore optimize for the wrong value. However, techniques exist to ensure the quality of fit of a Bayesian Hierarchical Model, such as posterior predictive checks.

B. Sample

This section focuses on how to leverage this AV performance representation for sampling.

The following entropy definition can be used represent the uncertainty around the intrinsic performance parameter $\sigma$:

$$H(\sigma) = -\sum_\sigma P(\sigma)\log P(\sigma). \quad \text{(Eq. 2)}$$

If $\mathcal{A}$ is the set of scenarios that are observed, the information gain about a from observing performance in $\mathbb{R}$ is defined as:

$$I(\sigma; X^\mathcal{A}) = H(\sigma) - H(\sigma|X^\mathcal{A}) \quad \text{(Eq. 3)}.$$

There are $$\binom{k^n}{a}$$

scenario sets of size a in this scenario space, with $a \leq k^n$. The goal is to examine these options and choose the set that maximizes information gain before generating the scenarios in a simulation engine or in closed course testing. The optimization problem is therefore defined as:

$$\max_{\mathcal{A} \subseteq V} f(\mathcal{A}) \text{ s.t. } |\mathcal{A}| \leq C, \quad \text{(Eq. 4)}$$

where C is the scenario budget, and $f$ could be either $I(\sigma; X^\mathcal{A})$ for an overall AV assessment across the entire ODD, or $I(B_p; X^\mathcal{A})$ for an assessment of AV performance in a hyperplane of the ODD, such as a specific town. C is the equivalent of the stopping criterion. The conditional entropy $H(\sigma|X^\mathcal{A})$ can only be approximated up to a certain value with a given confidence interval. The optimization can be stopped when the approximated information gain stops increasing in a statistically significant manner, which decides C.

This optimization problem is NP-hard, even in a simple setting where all scenarios have the same cost. Nonetheless, both of the potential objective functions are monotone submodular. A function $f:2^V \to \mathbb{R}$ is submodular if and only if for every $A \subset B \subset V$ and $e \in V$, $$f(A \cup \{e\}) - f(A) \geq f(B \cup \{e\}) - f(B) \quad \text{(Eq. 5)}.$$

This means that adding a scenario to an already large set will provide a lower information gain than adding a scenario to a smaller test set. This reflects an intuition that adding more and more scenarios to a set will yield diminishing returns, albeit positive returns. For example, as shown in FIG. 16, after more and more discrete elements (e.g., scenarios) are added to the set over which the function is defined, the function increases by a smaller and smaller amount.

This property appears here because AV performances in different scenarios are conditionally independent given the hyperparameter $\sigma$. In general, the information gain about a random variable obtained from revealing another dependent random variable is not submodular. However, with a fixed AV stack, it is possible there exists a hyperplane in the scenario space that make AV performance in one scenario independent from AV performance in another scenario given that hyperplane. In the experiment that was conducted (detailed below), the number of collisions per scenario follows a Poisson distribution, with a fixed average in a given town. No additional assumption on AV performance is needed for the submodularity property to be true.

Since $f$ is submodular, the greedy algorithm can be used to provide a near-optimal to Equation 4. Starting with an empty set of scenarios, this heuristic selects the next scenario with the highest information gain at each iteration.

$$\mathcal{A}_i = \mathcal{A}_{i-1} \left\{ \arg\max_e f(\mathcal{A}_{i-1} \cup \{e\}) - f(\mathcal{A}_{i-1}) \right\}. \quad \text{(Eq. 6)}$$

Since this selection problem is NP-hard, there is no algorithm that will find the solution in polynomial time. However, the greedy algorithm can find a solution within $$1 - \frac{1}{e} \approx 0.63$$

of the optimal value. Concretely, if the maximum information gain for C scenarios is 1, a scenario set of size C yielding at least 0.63 information gain can be obtained.

Experiment and Results

An experiment was conducted to demonstrate the use of this processed with autonomous vehicle logs obtained from a computerized AV simulation (CARLA).

A. Data Generation

In this experiment, a model of an autonomous vehicle, available in CARLA, is also used to simulate background traffic in simulations. The vehicle attempts to follow routes in 6 different towns, with a changing number of traffic participants, for a total of 132 scenarios. These 3 features are the coordinates of the scenarios, shown in Table 1.

TABLE 1

| Scenario definitions. | | | |
|---|---|---|---|
| Scenario ID | Number of traffic participants | Town | Route ID |
| 1 | 10 | Town 02 | 1 |
| 2 | 10 | Town 02 | 2 |
| ... | | | |
| 132 | 150 | Town 06 | 49 |

Figure 19:
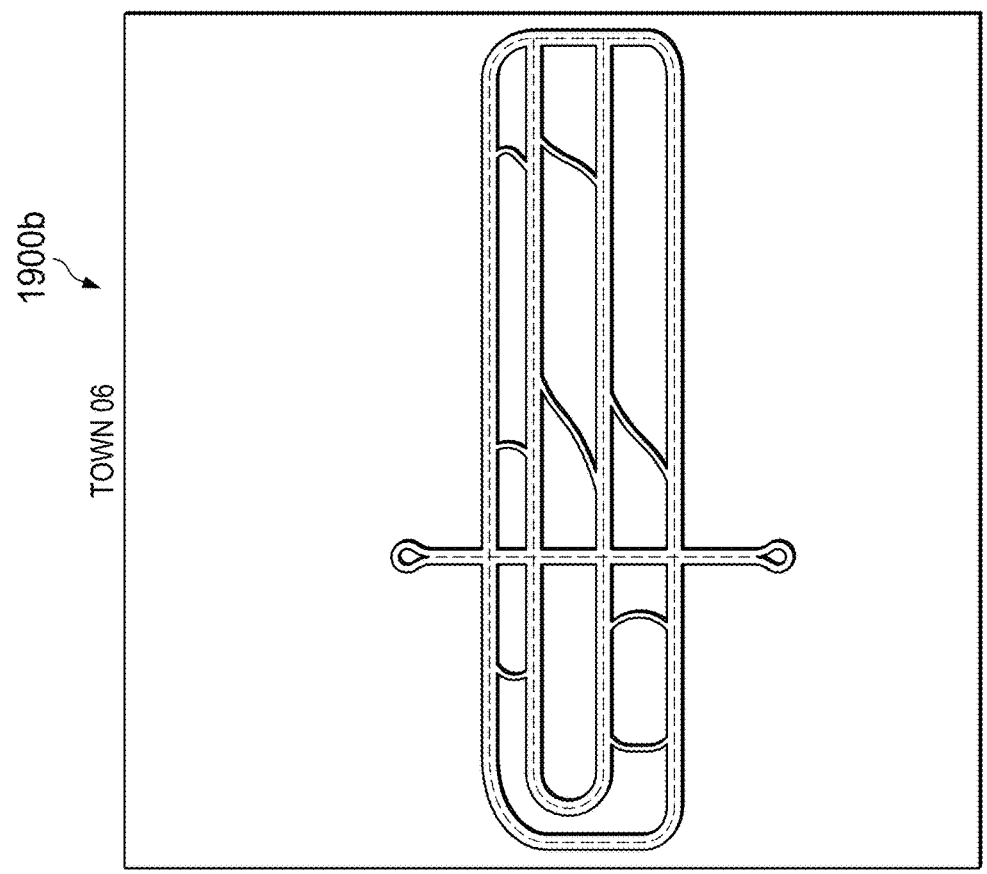
FIG. 19 shows maps of two example towns for assessing the performance of an AV.
Figure 19:
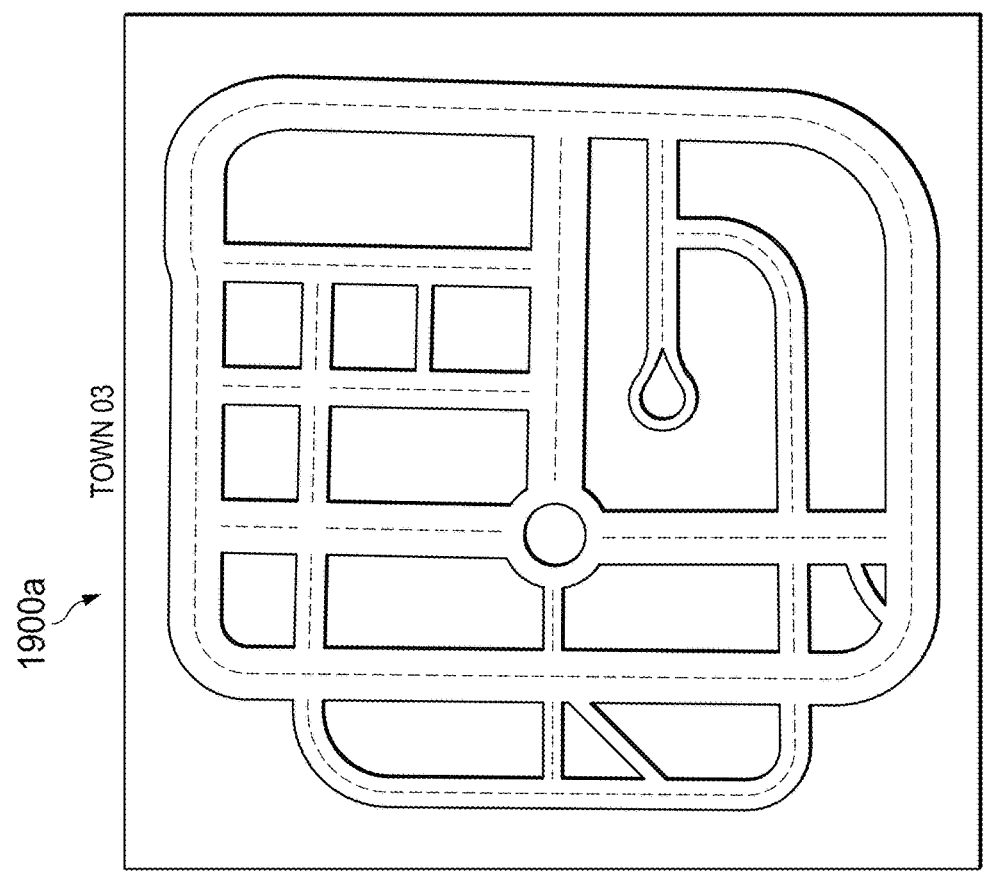

FIG. 19 shows maps 1900a and 1900b for two of the towns considered. As shown in FIG. 19, Town 03 (represented by the map 1900a) has substantially more intersection and roundabout, whereas Town 06 (represented by the map 1900b) has long stretches of straight roads.

The number of collisions the AV was involved in in each scenario was recorded, and this was selected as a performance metric $X_V$.

Figure 20:
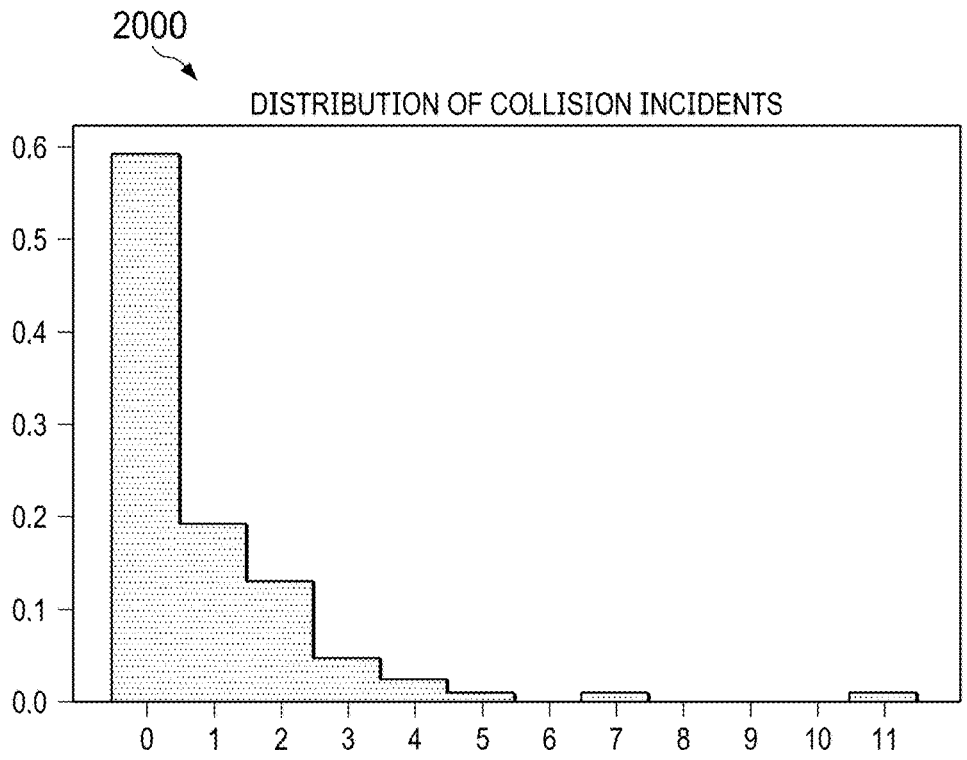
FIG. 20 shows the probability distribution of collisions in all scenarios of an example computerized simulation.

The Poisson distribution is often used to express the probability of a number of events happening independently over fixed intervals. FIG. 20 shows the probability distribution 2000 of $X_V$ in all scenarios, which aligns well with the Poisson assumption. Notably, the used AV implementation encounters a significant number of collisions per scenario because it does not have a perception module, as it is normally only used for background traffic, and only consumes map and route information. It therefore does not react to dynamic objects in the scene. However, information about AV implementation is not necessary to apply this technique.

B. Bayesian Hierarchical Model

Figure 21:
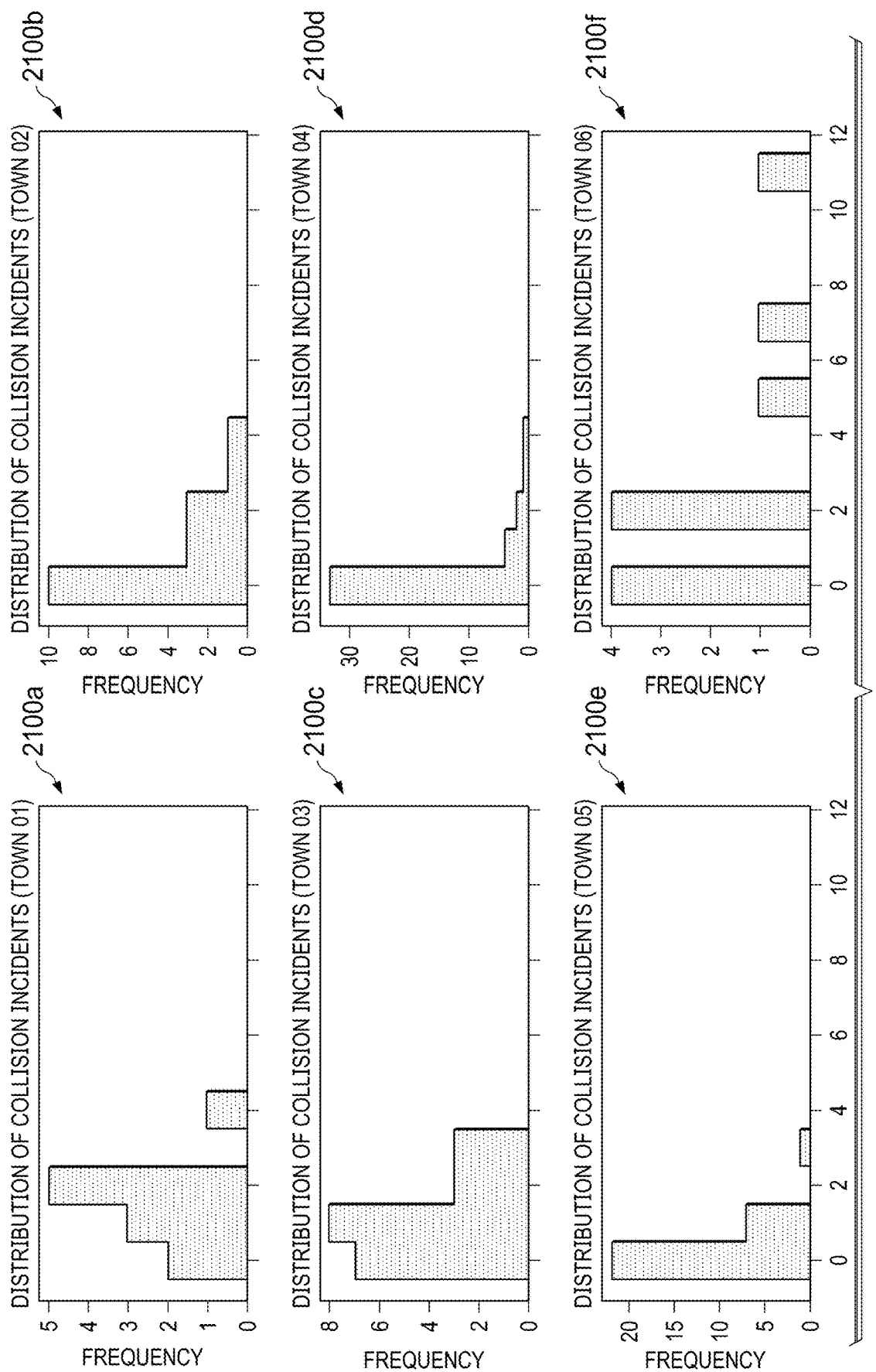
FIG. 21 shows distributions of collisions along a route for the six example towns according to an example computerized simulation.

After data analysis, a determination was made that the town is the scenario coordinate that has the biggest influence on the number of collisions per scenario. For example, FIG. 21 shows distributions of collisions 2100a-2100f along a route for the six different towns in CARLA. This grouping can be inferred from a small amount of data that is already available, or decided based on expert knowledge.

Therefore, the scenario space was sliced by town, and fit the following Bayesian Hierarchical Model:

$$X \sim \text{Poisson}(B)$$

$$B \sim \text{HalfNormal}(\Sigma_b)$$

$$\Sigma_b \sim \text{HalfNormal}(5) \quad \text{(Eqs. 7)}.$$

Figure 22A:
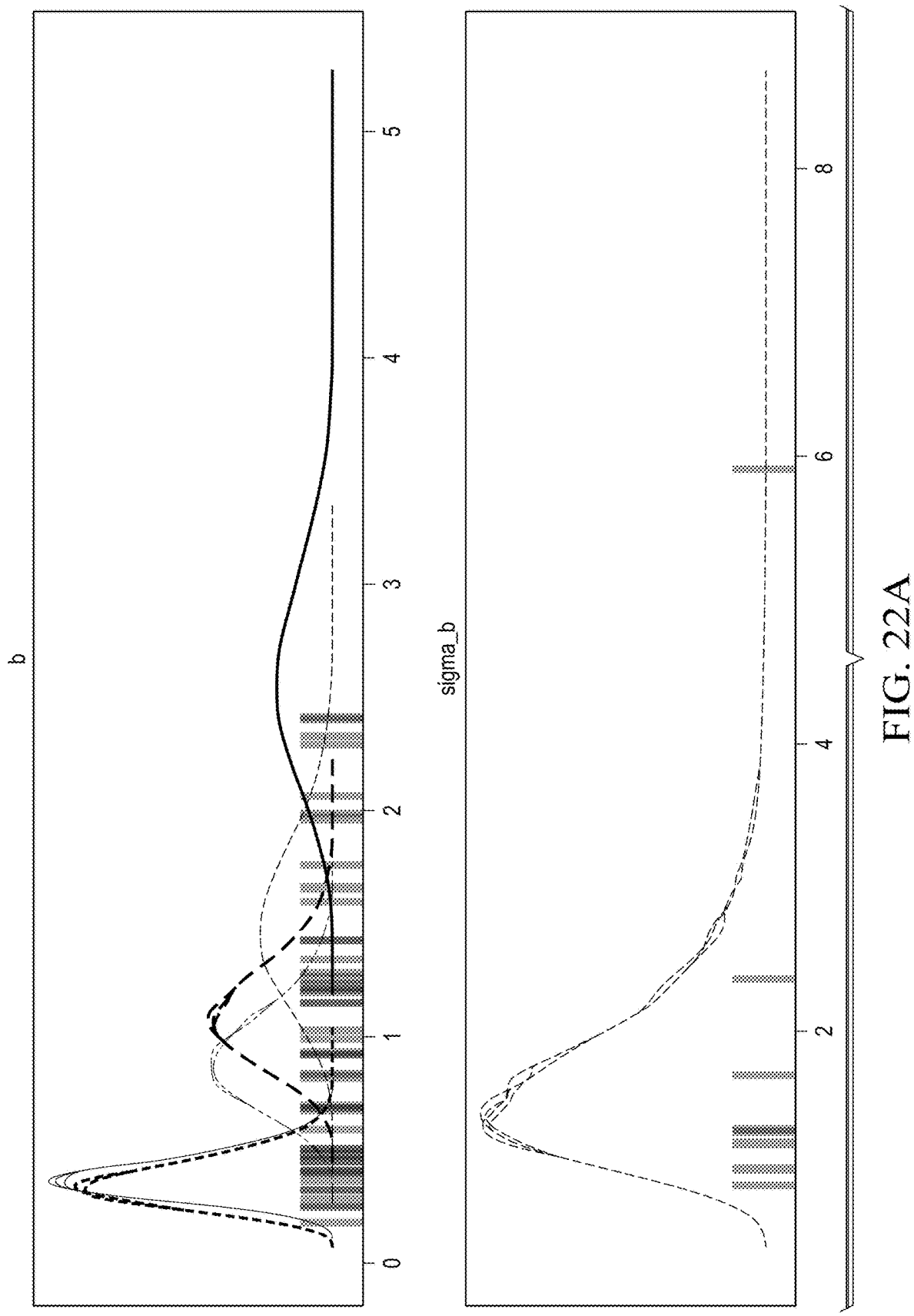
FIG. 22A shows an example posterior distribution of unobservable parameters of a fitted Bayesian Hierarchical Model.
Figure 22B:
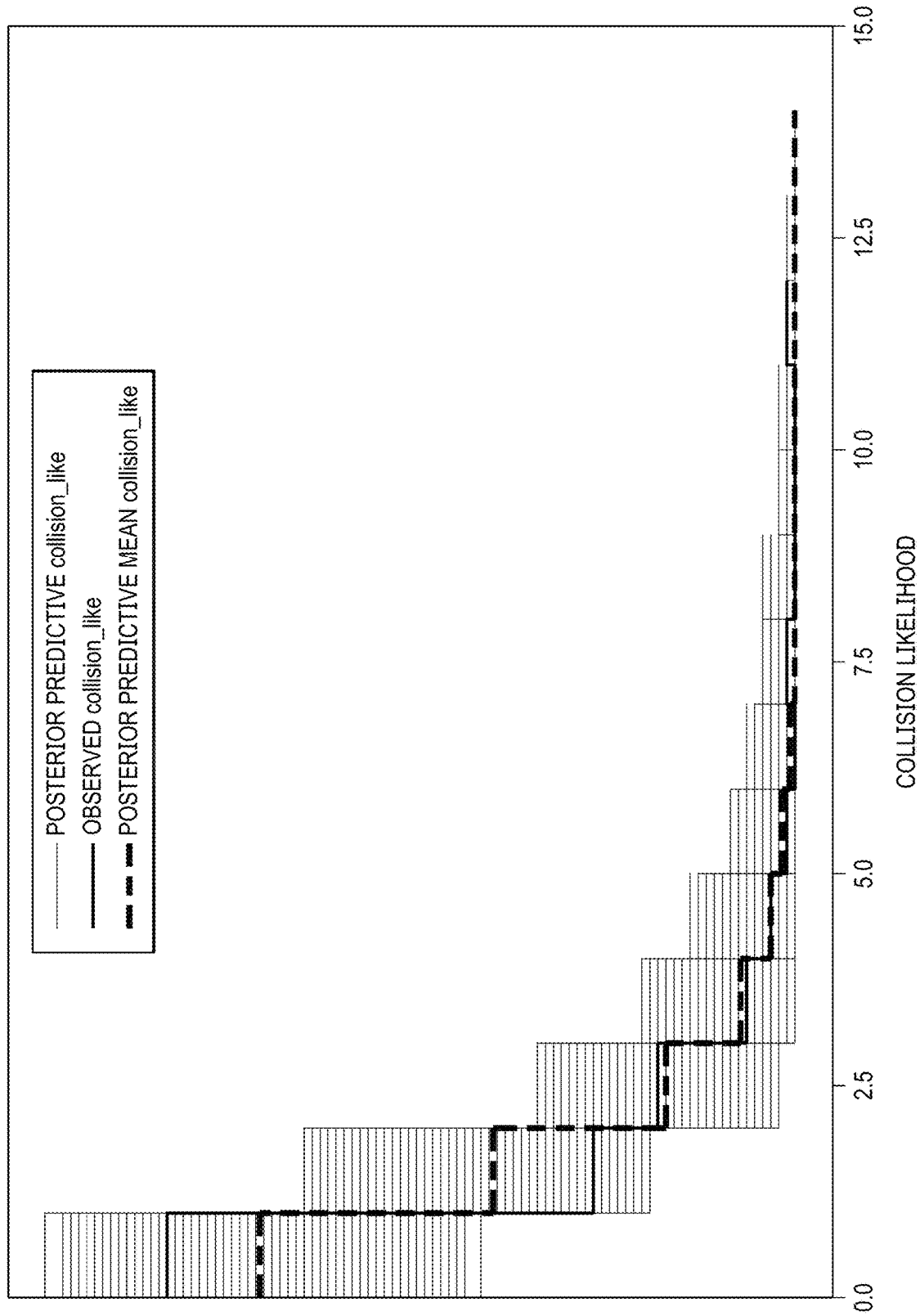
FIG. 22B shows an example predictive posterior fit of the Bayesian Hierarchical Model.

The half-normal distribution is chosen for the parameter by and hyperparameter—as weakly informative priors. PyMC3 (PyMC3 Development Team) was used to perform this fit. The results of the fitted Bayesian Hierarchical Model are shown in FIG. 22A (e.g., showing the posterior distribution of unobservable parameters). The resulting average number of collisions per scenario varies greatly, between less than 1 for some towns and more than 2.5 for others. FIG. 22B shows a predictive posterior fit of the Bayesian Hierarchical Model. As shown in FIG. 22B, a predictive posterior check shows that the average value of the graph-based re-generated samples of X aligns well with the observed values, except for {0,1}. This means that the fit is better for larger values of the random variable, however it is still producing values within the observed region for 0 and 1.

C. Scenario Selection

The information gain on AV performance is optimized across ODDs. However, the same technique can be applied to choose a scenario set to maximize information gain for a specific town.

$$\max_{\mathcal{A} \subseteq V} I(\sigma; X_{\mathcal{A}}) \text{ s.t. } |\mathcal{A}| \leq C. \quad \text{(Eq. 8)}$$

The Bayesian Hierarchical Model allows the computation of $\mathbb{P}(\sigma|X)$, which is then used to compute the conditional entropy and the information gain of any new scenario. As long as a scenario can be placed in the graph, the added information it provides can be inferred.

Algorithm 1 details example steps to solve Equation 8. The conditional entropy $H(\sigma|X_{\mathcal{A}})$ is computed up to a 90% confidence interval on an absolute error of 0.1. At each step, a scenario is added to the set $\mathcal{A}$ by greedily looking at each scenario one-by-one, computing the information gained from revealing performance in this scenario compared with the previously chosen scenarios, and taking the one that has the highest information gain for this step. This procedure is repeated until the information gain stops growing (within 90% confidence). This is why this algorithm is said to break ties arbitrarily.

Algorithm 1—Greedy Algorithm:

Input: $\mathcal{V}$ the list of all possible scenarios, M an inference model

Output: $\mathcal{A}^*$ a near-optimal, finite, scenario selection
Initialization

```
 1: 𝒜 = ∅, I₀ = H(Σ_b), I_diff = +∞, I = 0, k = 1
    Add scenarios to the set until there is no statistically
    significant information gain
 2: while I_diff > 0 do
 3:         for S ∈ V\𝒜 do
 4:
              perform inference on M to get ℙ (σ|X_S)
 5:           I = H(σ) − H(σ|X_S)
 6:           if I > I* then
 7:               I* = I
 8:               S* = S
 9:           end if
10:        end for
11:        𝒜 = 𝒜 ∪ S*
12:        I_k = I
13:        I_diff = I_k − I_{k−1}
14:        k = k + 1
15: end while
16: return 𝒜
```

Figure 23:
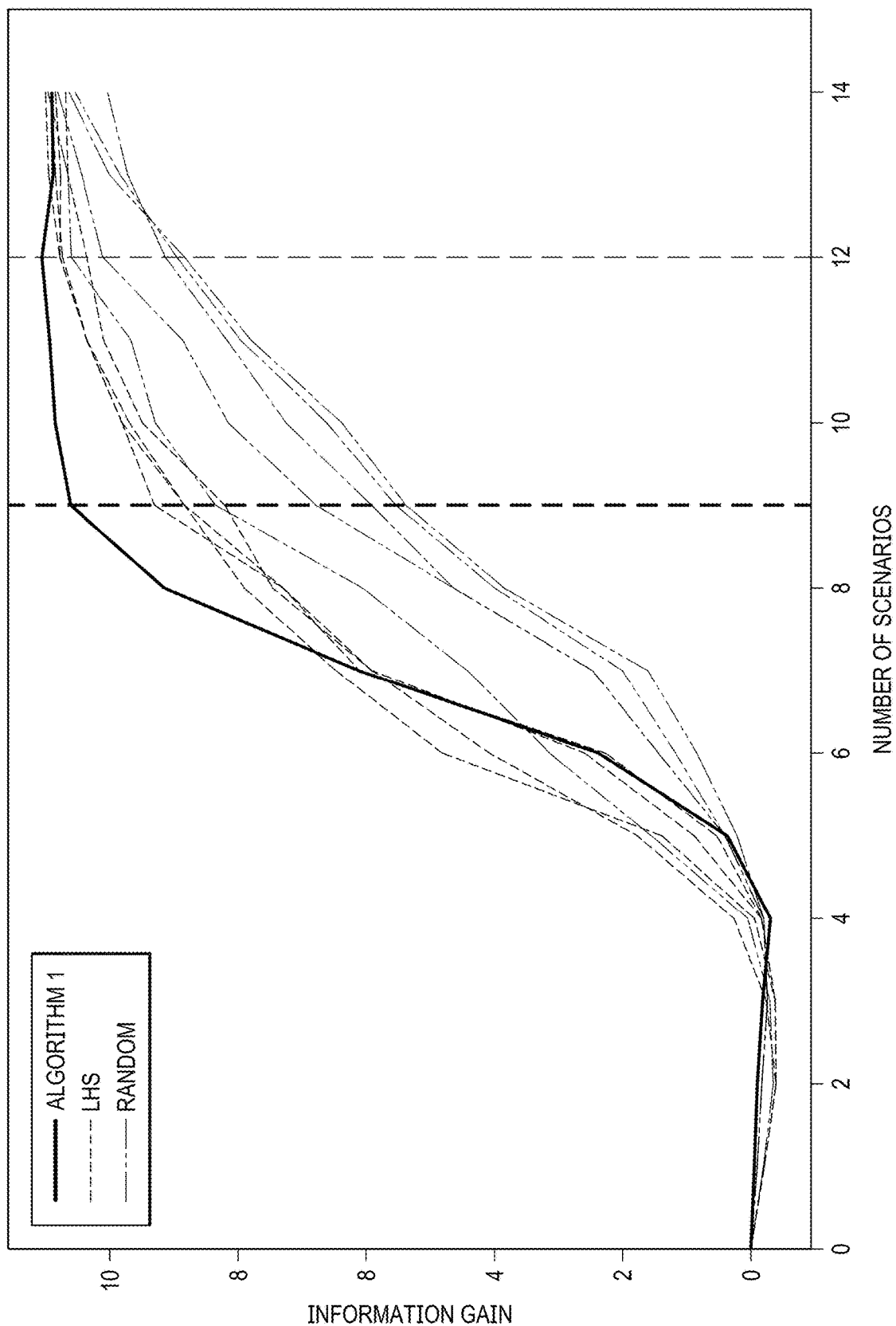
FIG. 23 shows a comparison of the information gain for an example scenario selection algorithm described herein, a Latin Hypercube Sampling implementation, and several random selections.

The results of Algorithm 1 with several runs of a Latin Hypercube Sampling implementation and several random selections were compared. The results are presented in FIG. 23, which shows a comparison of information gain and stopping criterion between Algorithm 1, Latin Hypercube Sampling, and random. The vertical lines show the stopping criterion for Algorithm 1 and for LHS. As shown in FIG. 23, all selections show the diminishing returns property, which confirms the submodularity property of the information gain, except for the first few scenarios. This is likely due to the approximation in computing this gain, which has a larger impact at the beginning for values close to zero. Additionally, using only a couple of observations may lead to a degenerated version of the model, which may explain the lack of submodularity for the first few observations.

Regarding the validation of the choice of metric to assess the relevance of a scenario set, an observation was made the information gain captures the fact that a well establish method such as LHS indeed performs better than random selections. This metric allows the comparison of any scenario selection method, regardless of ODD or activity analyzed. It also conveys a sense of progress in the evaluation campaign, and is intuitive and transparent—when significant amounts of information is no longer received, the evaluation can be stopped.

The main result in FIG. 23 is the following: with all sampling methods plateauing at the same information gain level, the proposed algorithm obtains this quantity with only 9 scenarios, or about 7% of the scenario space, whether LHS needs 12 scenarios, or about an extra 2% of the scenario space, and random methods need to explore at least another 2% of the space. This experiment was performed at a small scale, but these differences could represent a gain of millions of scenarios in a large scale AV validation process. The chosen set contains scenarios taking place in 4 different towns, but not all of them. Scenarios in towns 02 or 03 are not predicted to bring as much information as scenarios in towns 01, 04, 05, and 06. When AV is actually tested through the chosen scenarios, AV encounters mostly 0 or 1 collision but also is involved in 7 collisions in one scenario and in 11 collisions in another. Although the algorithm does not look for rare events, these scenarios at the tail of the distribution provide a lot of information about the system under test.

Experiment Summary

In summary, the scenario selection problem for AV performance evaluation can be reframed as a submodular optimization problem on a graph. In doing so, a statistical model can be used to represent AV performance, leveraging advances in quantitative AV behavior definition. Further, a Hierarchical Bayesian Model can be fit to a dataset generated by an open source AV implementation, suggesting that this technique can be applied to any AV implementation.

Once the Bayesian Hierarchical Model is validated, the submodularity property ensues, and a scenario set can be built to leverage this property. Information gain can be used to compare scenario selection methods regardless of ODD or activity examined.

Example Processes

Figure 24:
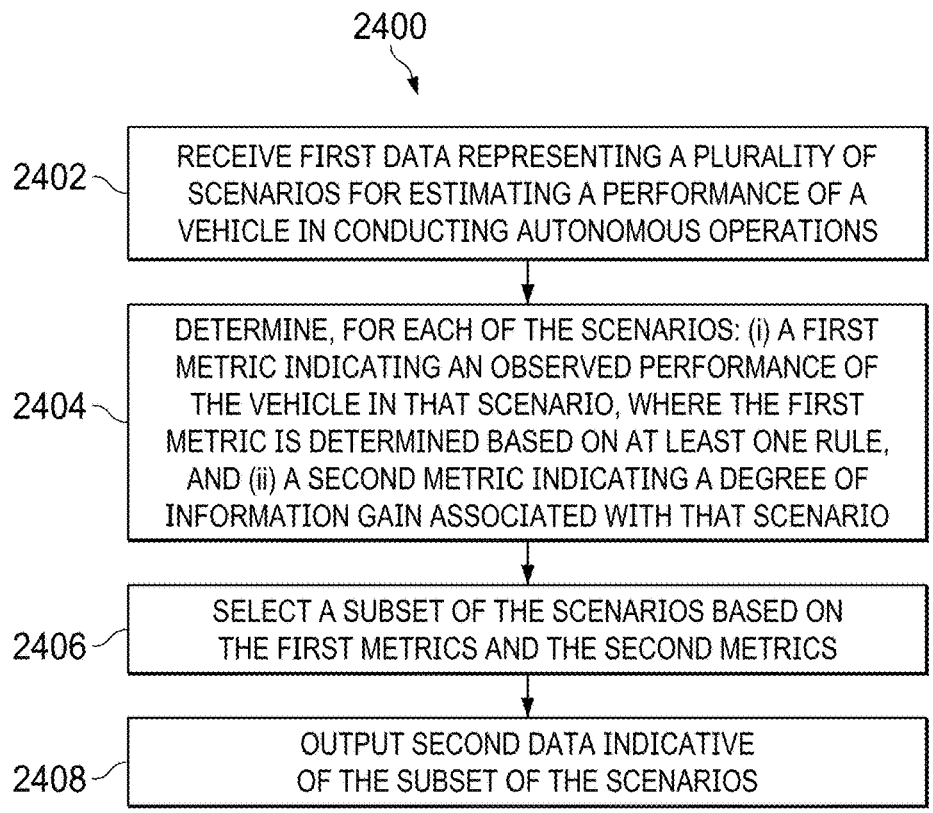
FIG. 24 shows a flow diagram of an example process for monitoring and controlling an operation of one or more AVs.

FIG. 24 shows an example process 2400 for selecting testing scenarios for evaluating the performance of AVs. The process 2400 can be performed, at least in part, using an AV performance evaluation system 1304 (e.g., as described with reference to FIGS. 13-23).

According to the process 2400, a computer system receives first data representing a plurality of scenarios for estimating a performance of a vehicle in conducting autonomous operations (block 2402). As an example, each of the scenarios can be a different respective combination of road conditions, obstacles, other vehicles, pedestrians, traffic flows, or environmental conditions. In some implementations, the autonomous operations can include autonomously navigating the vehicle from a first location to a second location.

The computer system determines, for each of the scenarios (i) a first metric indicating an observed performance of the vehicle in that scenario, where the first metric is determined based on at least one rule, and (ii) a second metric indicating a degree of information gain associated with that scenario (block 2404).

In some implementations, the first metric can indicate information regarding the performance of AV in each scenario, such as a number of collisions by the AV, a number of traffic rule violations by the AV, a number and/or an extent of route deviations by the AV, a number and/or extent of route obstructions by the AV, and/or a route traversal time by the AV.

In some implementations, the rules can include at least one traffic rule. Example traffic rules include a rule to obey signs or signals, a rule to drive with traffic, and a rule to maintain a legal speed.

In some implementations, the rules can include at least one safety rule. Example safety rules include a rule not to collide with other objects, a rule to maintain safe distance between other vehicles or pedestrians, and a rule to perform evasive maneuvers when necessary (e.g., to avoid other vehicles or pedestrians).

In some implementations, the rules can include at least one passenger comfort rule. Example passenger comfort rules include a rule to accelerate or decelerate smoothly, and a rule to turn smoothly.

In some implementations, the rules can include at least one vehicle performance rule. Example vehicle performance rules include a rule to not exceed certain speed, braking, and acceleration limitations of the vehicle.

In some implementations, for each of the scenarios, the degree of information gain associated with that scenario can correspond to a reduction in an entropy for an estimation of the performance of the vehicle.

The computer system selects a subset of the scenarios based on the first metrics and the second metrics (block 2406). In some implementations, the subset of the scenarios can be used for AV testing or validation.

In some implementations, the subset of the scenarios can be selected by identifying a plurality of candidate subsets of the scenarios, and determining, for each of the candidate subsets, a respective third metric indicating the degree of information again associated with that candidate subset. Further, the candidate subset having the highest one of the third metrics from among the candidate subsets can be selected as the subset of scenarios.

In some implementations, the subset of the scenarios can be selected by constraining a number of scenarios in the subset of scenarios according to a budget metric. For example, the budget metric can specify a maximum number of scenarios that can be tested.

The computer system outputs second data indicative of the subset of the scenarios (block 2408).

In some implementations, according to the process 2400, the computer system can determine an observed performance of at least one additional vehicle in each of the scenarios of the subset of the scenarios.

In some implementations, according to the process 2400, the computer system can cluster the plurality of scenarios into multiple clusters. Further, the subset of the scenarios is selected based on the clusters. In some implementations, the clusters can based on principal component analysis.

In some implementations, according to the process 2400, the computer system can determine an arrangement of the scenarios based on the clusters. Further, the subset of the scenarios can be selected based on the arrangement. In some implementations, the arrangement can be a Bayesian hierarchical model). In some implementations, the arrangement can be a Bayesian hierarchical model, a Bayesian network, a factor graph, and/or a Hidden Markov Model.

In some implementations, the subset of the scenarios can be selected from the arrangement according to a greedy algorithm.

In the foregoing description, several embodiments have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   receiving, by a computer system, first data representing a plurality of scenarios for estimating a performance of a vehicle in conducting autonomous operations;
   determining, by the computer system, for each of the scenarios:
      a first metric indicating an observed performance of the vehicle in that scenario, wherein the first metric is determined based on at least one rule, and
      a second metric indicating a degree of information gain associated with that scenario;
   determining, by the computer system, a Bayesian hierarchical model representing (i) one or more conditional independent properties of the performance of the vehicle according the plurality of scenarios and (ii) a submodularity of the degree of information gain associated with each of the scenarios;
   selecting, by the computer system, a subset of the scenarios based on the first metrics, the second metrics, and the Bayesian hierarchical model, wherein selecting the subset of the scenarios comprises determining that the subset of the scenarios is associated with a maximum degree of information gain from among the plurality of scenarios;
   outputting, by the computer system, second data indicative of the subset of the scenarios; and
   estimating the performance of the vehicle based on the second data, wherein estimating the performance of the vehicle comprises at least one of:
      performing a computerized simulation of the performance of the vehicle according to at least some of the subset of the scenarios, or
      causing the vehicle to operate according to at least some of the subset of the scenarios.

2. The method of claim 1, further comprising:
   determining, by the computer system, the observed performance of at least one additional vehicle in each of the scenarios of the subset of the scenarios.

3. The method of claim 1, further comprising:
   clustering, by the computer system, the plurality of scenarios into a plurality of clusters,
   wherein the subset of the scenarios is selected based on the clusters.

4. The method of claim 3, further comprising:
   determining, by the computer system, an arrangement of the plurality of scenarios based on the clusters,
   wherein the subset of the scenarios is selected based on the arrangement.

5. The method of claim 4, wherein the subset of the scenarios is selected from the arrangement according to a greedy algorithm.

6. The method of claim 1, wherein for each of the scenarios, the degree of information gain associated with that scenario corresponds to a reduction in an entropy for an estimation of the performance of the vehicle.

7. The method of claim 1, wherein selecting the subset of the scenarios comprises:
   identifying a plurality of candidate subsets of the scenarios,
   determining, for each of the candidate subsets, a respective third metric indicating the degree of information gain associated with that candidate subset, and
   selecting, from among the candidate subsets, the candidate subset having the highest one of the third metrics as the subset of the scenarios.

8. The method of claim 1, wherein selecting the subset of the scenarios comprises:
   constraining a number of scenarios in the subset of the scenarios according to a budget metric.

9. The method of claim 1, wherein the at least one rule comprises at least one of:
   at least one traffic rule,
   at least one safety rule,
   at least one passenger comfort rule, and
   at least one vehicle performance rule.

10. The method of claim 1, wherein the autonomous operations comprise autonomously navigating the vehicle from a first location to a second location.

11. A system comprising:
    at least one processor; and at least one non-transitory computer readable medium storing instructions that, when executed by the at least one processor, cause the at least one processor to perform operations comprising:
receiving first data representing a plurality of scenarios for estimating a performance of a vehicle in conducting autonomous operations;
determining, for each of the scenarios:
a first metric indicating an observed performance of the vehicle in that scenario, wherein the first metric is determined based on at least one rule, and
a second metric indicating a degree of information gain associated with that scenario;
determining a Bayesian hierarchical model representing (i) one or more conditional independent properties of the performance of the vehicle according the plurality of scenarios and (ii) a submodularity of the degree of information gain associated with each of the scenarios;
selecting a subset of the scenarios based on the first metrics, the second metrics, and the Bayesian hierarchical model, wherein selecting the subset of the scenarios comprises determining that the subset of the scenarios is associated with a maximum degree of information gain from among the plurality of scenarios;
outputting second data indicative of the subset of the scenarios; and
estimating the performance of the vehicle based on the second data, wherein estimating the performance of the vehicle comprises at least one of:
performing a computerized simulation of the performance of the vehicle according to at least some of the subset of the scenarios, or
causing the vehicle to operate according to at least some of the subset of the scenarios.

12. At least one non-transitory computer readable medium storing instructions that, when executed by at least one processor, cause the at least one processor to perform operations comprising:
receiving first data representing a plurality of scenarios for estimating a performance of a vehicle in conducting autonomous operations;
determining, for each of the scenarios:
a first metric indicating an observed performance of the vehicle in that scenario, wherein the first metric is determined based on at least one rule, and
a second metric indicating a degree of information gain associated with that scenario;
determining a Bayesian hierarchical model representing (i) one or more conditional independent properties of the performance of the vehicle according the plurality of scenarios and (ii) a submodularity of the degree of information gain associated with each of the scenarios;
selecting a subset of the scenarios based on the first metrics, the second metrics, and the Bayesian hierarchical model, wherein selecting the subset of the scenarios comprises determining that the subset of the scenarios is associated with a maximum degree of information gain from among the plurality of scenarios;
outputting second data indicative of the subset of the scenarios; and
estimating the performance of the vehicle based on the second data, wherein estimating the performance of the vehicle comprises at least one of:
performing a computerized simulation of the performance of the vehicle according to at least some of the subset of the scenarios, or
causing the vehicle to operate according to at least some of the subset of the scenarios.

\* \* \* \* \*